United States Patent
Bezaire et al.

(10) Patent No.: US 6,315,161 B1
(45) Date of Patent: Nov. 13, 2001

(54) METHOD AND APPARATUS FOR APPLYING A FOAMABLE RESIN

(75) Inventors: Leon J. Bezaire, Ray Township; Robert D. Snyder, St. Helen; Roney J. Matijega, Lake Orion, all of MI (US)

(73) Assignee: Jesco Products Company, Inc., Sterling Heights, MI (US)

( * ) Notice: Subject to any disclaimer, the term of this patent is extended or adjusted under 35 U.S.C. 154(b) by 0 days.

(21) Appl. No.: 09/653,512

(22) Filed: Sep. 1, 2000

Related U.S. Application Data

(63) Continuation-in-part of application No. 09/248,056, filed on Feb. 10, 1999.
(60) Provisional application No. 60/074,276, filed on Feb. 10, 1998.

(51) Int. Cl.[7] .......................................................... B67D 5/06
(52) U.S. Cl. ........................ 222/1; 222/145.2; 222/145.5; 222/149; 222/504; 239/117; 239/433
(58) Field of Search .................................. 222/1, 63, 134, 222/149, 145.2, 145.5, 504; 239/61, 69, 75, 116, 117, 413, 433

(56) References Cited

U.S. PATENT DOCUMENTS

| | | |
|---|---|---|
| Re. 29,665 | 6/1978 | Gusmer et al. . |
| Re. 35,010 | 8/1995 | Price . |
| 3,038,750 | 6/1962 | Nielsen . |
| 3,366,337 | 1/1968 | Brooks et al. . |
| 3,379,376 | 4/1968 | Williams et al. . |
| 3,385,526 | 5/1968 | Furrer . |
| 3,463,363 | 8/1969 | Zelna . |
| 3,541,023 | 11/1970 | Cole, III . |
| 3,561,680 | 2/1971 | Ott . |
| 3,578,246 | 5/1971 | Davis, Sr. . |
| 3,758,001 | 9/1973 | Callan . |
| 3,786,990 | 1/1974 | Hagfors . |
| 3,986,672 | 10/1976 | Smith et al. . |
| 4,003,501 | 1/1977 | Ramazzotti et al. . |
| 4,090,695 | 5/1978 | Stone et al. . |
| 4,133,483 | 1/1979 | Henderson . |
| 4,199,303 | 4/1980 | Gusmer et al. . |
| 4,204,612 | 5/1980 | Schrader et al. . |

(List continued on next page.)

*Primary Examiner*—Kevin Shaver
*Assistant Examiner*—Patrick Buechner
(74) *Attorney, Agent, or Firm*—Reising, Ethington, Barnes, Kisselle, Learman & McCulloch, P.C.

(57) ABSTRACT

A method and apparatus for dispensing multi-component foamable fluid plastic materials such as polyurethane foams. The apparatus includes a mixing chamber defined by an axial passage in a support body structure. The mixing chamber receives reactant fluids for mixing then allows the fluids to exit through an opening at one end of the axial passage. Two fluid inlet openings in a wall of the axial passage admit reactant fluid into the mixing chamber. Two mixing chamber fluid inlets formed in the support body structure communicate reactant fluid sources with the mixing chamber through the inlet openings. When retracted, a valve needle in the axial passage exposes the inlet openings to admit reactant fluids into the mixing chamber. When advanced, the needle closes off the inlet openings and pushes the mixed fluids from the mixing chamber. The valve needle includes three parallel helical grooves that help purge the mixing chamber of unreacted and reacted fluids. The grooves are arranged so that none of them can provide a fluid path between inlet openings when the needle is not retracted. Another embodiment of the apparatus includes three fluid inlet openings arranged to prevent reactant fluids from crossing over to opposing inlet openings. The method includes pre-filling the grooves before assembling the apparatus rather than allowing them to fill with foamable material during use.

11 Claims, 14 Drawing Sheets

U.S. PATENT DOCUMENTS

| | | |
|---|---|---|
| 4,204,977 | 5/1980 | Zwirlein . |
| 4,377,256 | 3/1983 | Commette et al. . |
| 4,386,716 | 6/1983 | Buck . |
| 4,427,153 | 1/1984 | Schaefer . |
| 4,453,670 * | 6/1984 | Sivory ................................. 239/117 |
| 4,471,887 | 9/1984 | Decker . |
| 4,523,696 | 6/1985 | Commette et al. . |
| 4,568,003 * | 2/1986 | Sperry et al. ..................... 222/145.5 |
| 4,809,909 | 3/1989 | Kukesh . |
| 4,926,886 | 5/1990 | Lorenzen et al. . |
| 5,050,776 | 9/1991 | Rosenplanter . |
| 5,086,949 * | 2/1992 | Vulpitta et al. .......................... 222/1 |
| 5,090,814 | 2/1992 | Petcen . |
| 5,180,082 * | 1/1993 | Cherfane .......................... 222/145.2 |
| 5,271,521 | 12/1993 | Noss et al. . |
| 5,299,740 | 4/1994 | Bert . |
| 5,303,865 | 4/1994 | Bert . |
| 5,339,991 | 8/1994 | Snyder . |
| 5,348,230 | 9/1994 | Mullen et al. . |
| 5,375,634 | 12/1994 | Egger . |
| 5,388,761 | 2/1995 | Langeman . |
| 6,102,304 | 8/2000 | Gonitzke et al. . |

\* cited by examiner

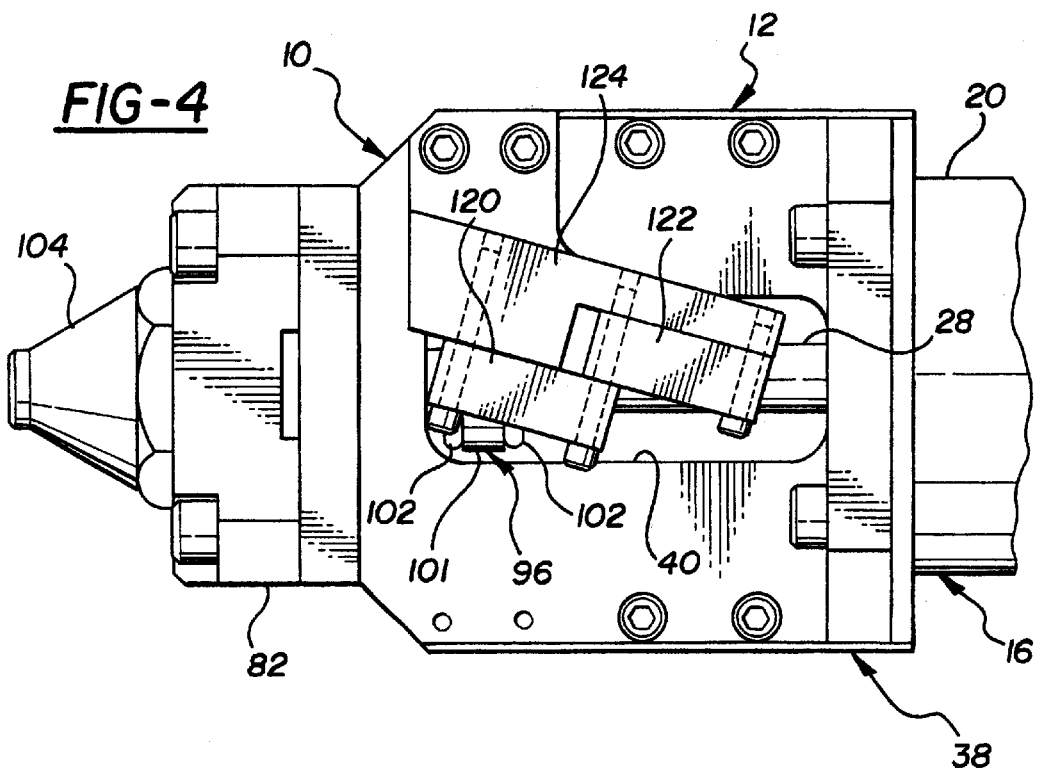
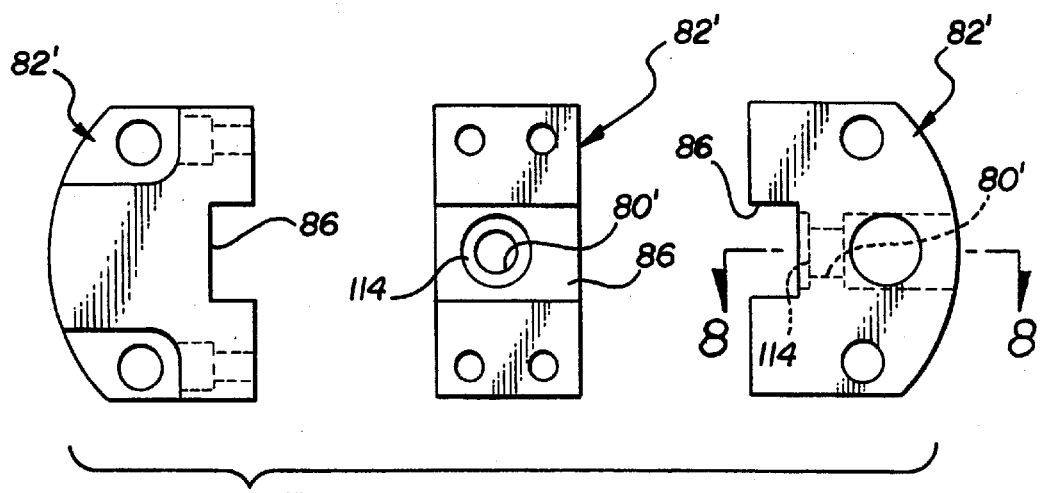
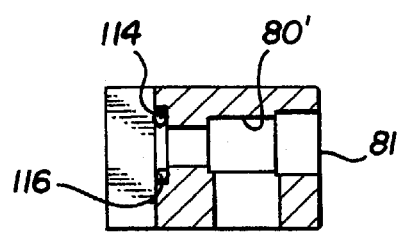

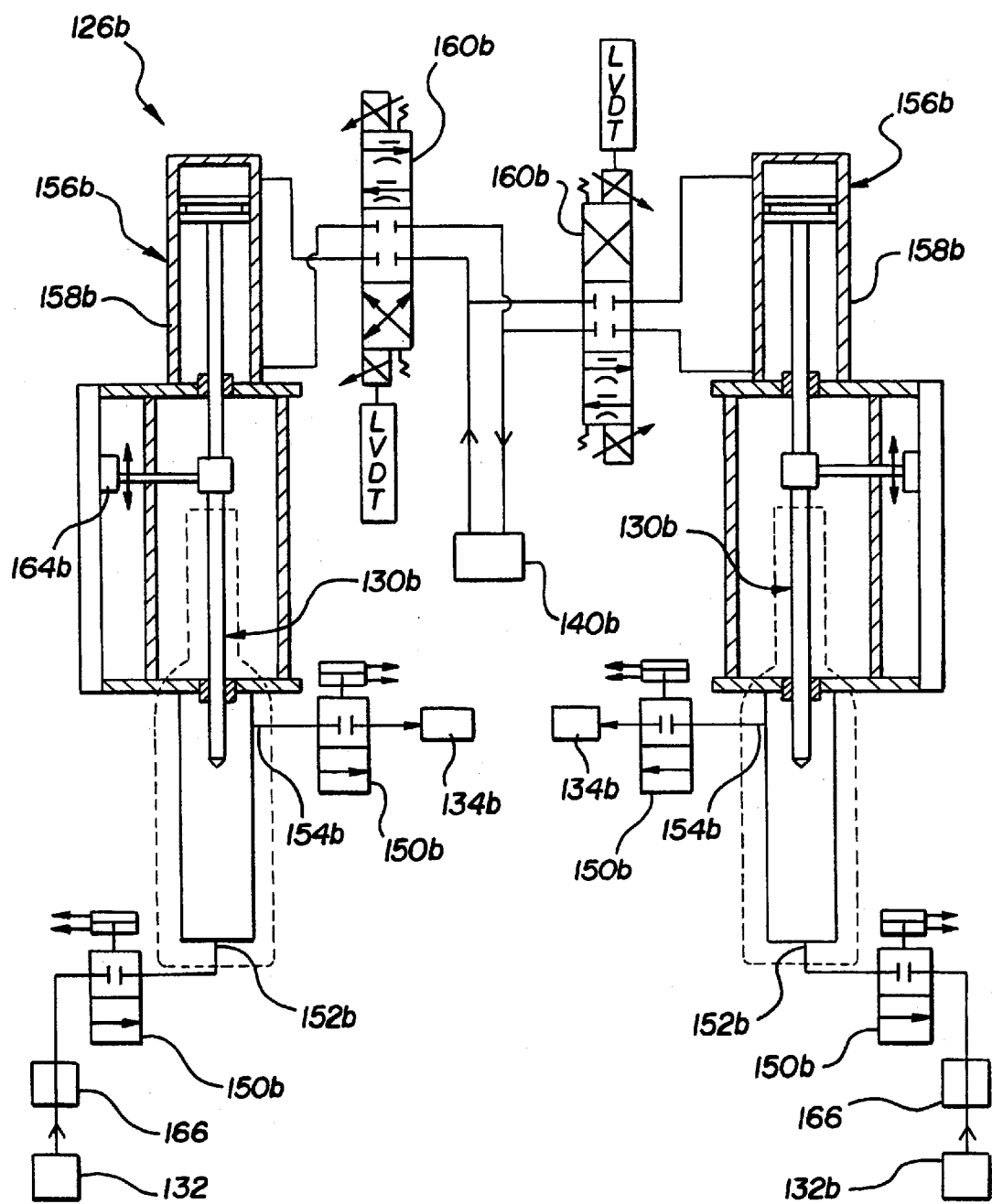

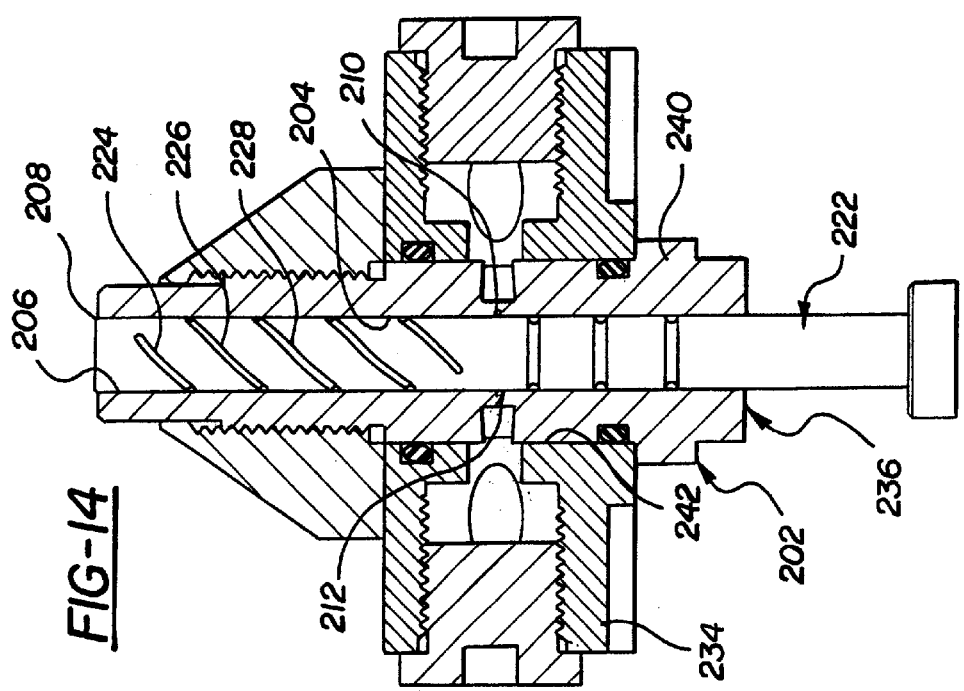
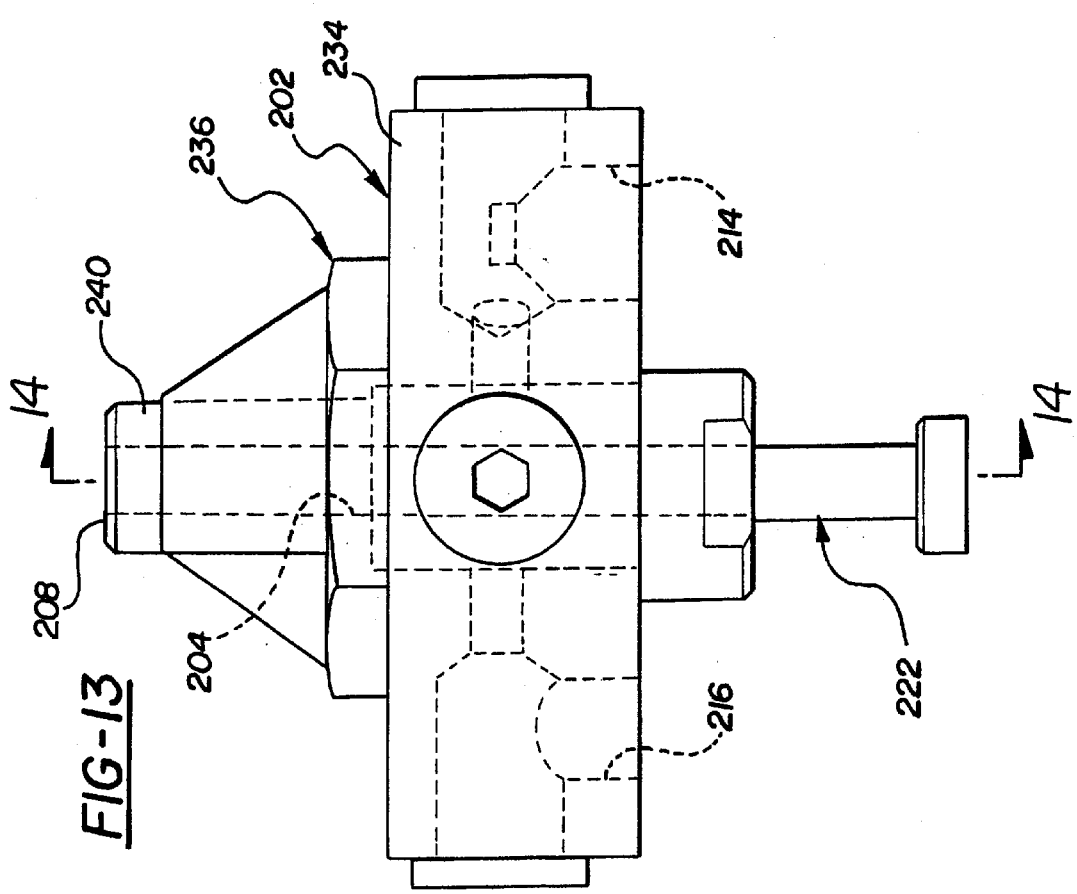

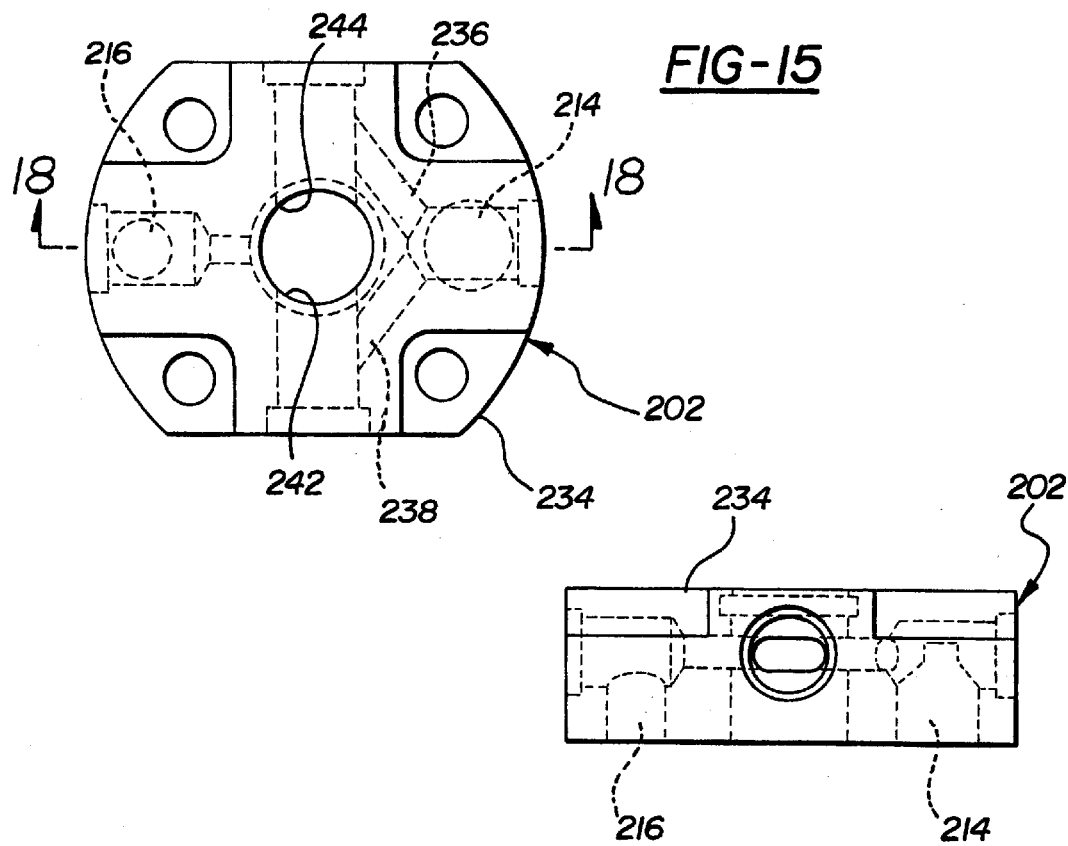
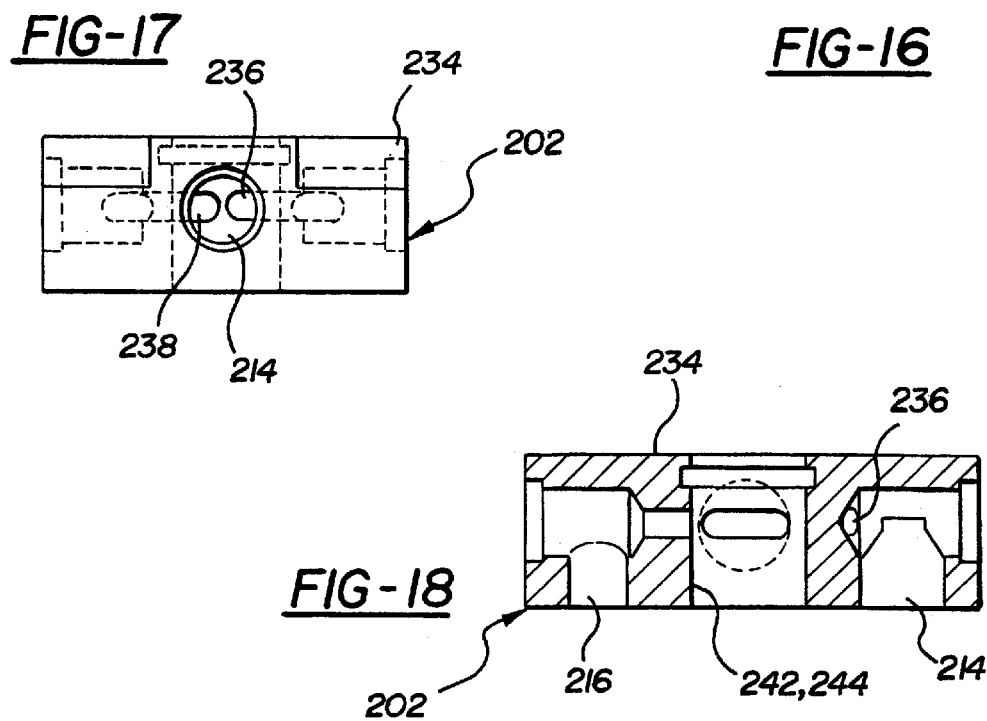

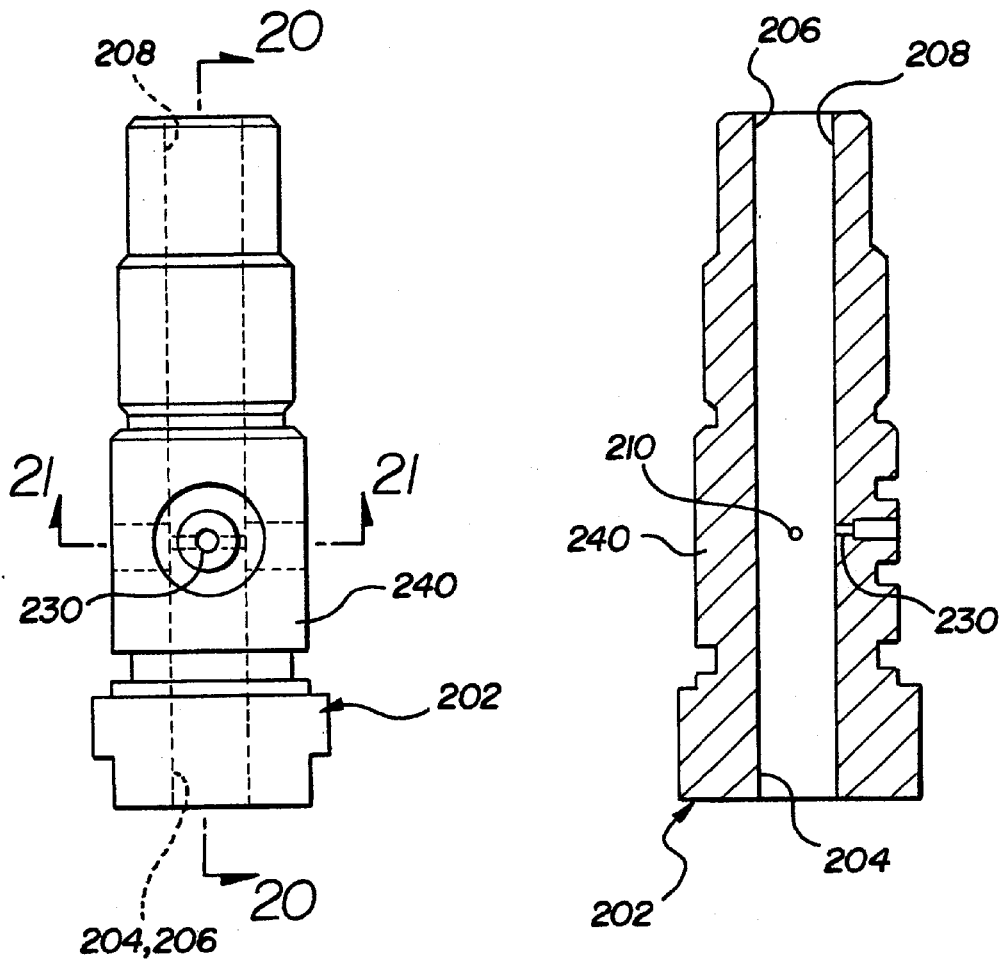
FIG-19
FIG-20
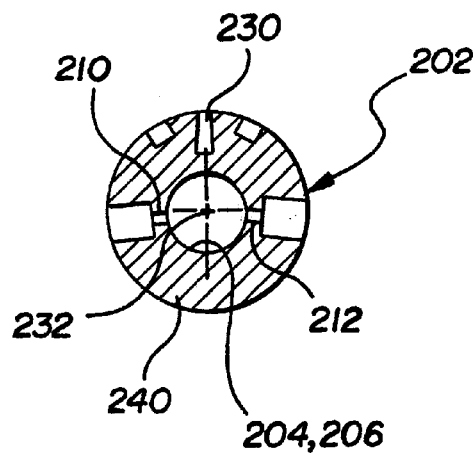
FIG-21

METHOD AND APPARATUS FOR APPLYING A FOAMABLE RESIN

This application is Continuation in Part of U.S. patent application Ser. No. 09/248,056 filed Feb. 10, 1999 which is based on provisional application Ser. No. 60/074,276 filed Feb. 10, 1998.

FIELD OF THE INVENTION

This invention relates generally to a method and apparatus for dispensing and applying multi-component foamable fluid plastic materials such as polyurethane foams.

DESCRIPTION OF THE PRIOR ART

Foam application systems are commercially available that apply multi-component foamable fluid plastic materials, preferably polyurethanes. The standard reactant fluids comprise a plastic material fluid component and an isocyanate fluid component bearing comparable viscosities and used in comparable ratios.

Typically, a foam application apparatus will include a cylindrical mixing chamber having separate orifi or fluid inlet openings for each reactant component and an axial passage transverse to the direction of the inlet passages for allowing the mixed or reacted fluid to exit the mixing chamber. The mixing chamber is typically mounted in a support body structure. The dimensional tolerance between the mixing chamber and valve body is made sufficiently close so that the reactant fluids cannot flow therebetween. Standard reactant fluids are generally sufficiently viscous to prevent them from flowing between the mixing chamber and valve body.

A cylindrical rod or valve needle having an external diameter nearly the same as the internal diameter of the cylindrical mixing chamber moves forwardly and rearwardly in the mixing chamber. In the forward position, the valve needles close off the fluid inlet openings to prevent any fluid from entering the mixing chamber. In the rearward position, the valve needle is retracted under hydraulic pressure to expose the inlet openings to permit their respective fluids to flow in the mixing chamber and impingement mix therein. When enough reacted fluid has been dispensed, the valve needle moves to its forward position to once again close the inlet passages and prevent reactant fluid flow into and mixing in the mixing chamber.

One apparatus of this type is disclosed in U.S. Pat. No. 4,377,256 to Commette, et al. Another is disclosed in U.S. Pat. No. 5,339,991 to Synder. One common problem that is disclosed in U.S. Pat. No. 5,339,991 is that conventional foam applications commonly seize up after a few thousand shots requiring cleaning of the valve components and mixing chamber before reuse.

Another problem has recently developed with respect to foam application guns. Recently developed chemistry using non-standard reactant fluids may also be used to make a "low MDI" plastic foam. Low MDI foam includes one reactant fluid that includes either no isocyanates or a relatively small amount of isocyanates and a second reactant fluid that includes a resin component. Some of these non-standard reactant fluids are not as viscous as the standard reactant fluids and may tend to seep and "cross-over" from one inlet opening to another between the mixing chamber and the valve needle body.

SUMMARY OF THE INVENTION AND ADVANTAGES

The invention includes a method and apparatus for dispensing and applying multi-component foamable fluid plastic materials such as polyurethane foams. The apparatus includes a mixing chamber that is defined by an axial passage in the support body structure. The mixing chamber is configured to receive reactant fluids for mixing and to allow the mixed reactant fluids to exit through an opening at an axial outer end of the axial passage. Two generally transverse fluid inlet openings are formed in a wall of the axial passage and are configured to admit reactant fluid into the mixing chamber. Two mixing chamber fluid inlets are formed in the support body structure and are configured to provide fluid communication between reactant fluid sources and the mixing chamber through the respective inlet openings. An elongated valve needle is supported in the axial passage for reciprocal longitudinal movement between forward closed and a rearward open positions. The valve needle is configured to expose the inlet openings when retracted to the rearward open position to permit the reactant fluids to flow into the mixing chamber from the respective inlet openings and impingement mix therein. The valve needle is configured to close off the inlet openings and dispense the mixed fluids from the mixing chamber through an opening at the outer end of the axial passage while being advanced to the forward closed position. The valve needle includes a first helical groove configured to purge the mixing chamber of unreacted and reacted fluids.

Unlike the prior art of record, the valve needle includes second and third helical grooves disposed generally parallel to the first helical groove in a triple-start helix configuration. As a result, when valve needle moves from the closed to the open position, only helical grooves (no circumferential grooves) move past the inlet openings in the mixing chamber. It is impossible for any two inlet openings to be connected by a fluid path until the needle is in the open position. The triple-start helical grooves also help to eliminate metal-to-metal surface area contact between the rod and the axial passage because the additional grooves reduce the amount of outer circumferential surface area that the needle presents to the axial passage. The three groove configuration also fills with hard polymer faster, more completely and more uniformly than a single or two-groove helix. This is because the configuration of each groove in the triple helix is such that each groove is presented more frequently before the inlet openings as the valve needle moves in the axial passage. Still further, the three groove configuration provides more scraping action along inner walls of the mixing chamber and across the face of the inlet openings which keeps the inlet openings free of partial obstructions.

The invention also includes a method for mixing and applying foamable resin. According to the method, the needle grooves are pre-filled with a suitable material before supporting the valve needle in the axial passage before completing the assembly of the apparatus. The grooves are pre-filled to prevent reactant fluid crossover. By sealing the grooves against leakage the pre-filling obviates the need for an end user to initially fill the grooves by taking multiple preparatory shots. This eliminates the wasted reactant fluids required to make the number of shots (approximately 80–120 shots for low MDI foam) that may otherwise be necessary to fill the grooves before the apparatus can be reliably used for its intended purpose. Without pre-filling, there is a much higher chance of cross-over occurring around the needle—especially when the gun is not used for a period of time or is left sitting still while heated and under pressure.

BRIEF DESCRIPTION OF THE DRAWINGS

FIG. 4 is a bottom view of the preferred embodiment of the present invention, partially broken away;

FIG. 7 includes front, side and back elevational views of one half of the mix head of the embodiment of FIG. 6;

FIG. 8 is a cross-sectional view taken along lines 8—8 of FIG. 7;

FIG. 9b is a schematic view of an alternate reactant fluid delivery system according to the present invention;

FIG. 13 is a front view of the mix head of FIG. 11;

FIG. 14 is a cross-sectional front view of the mix head of FIG. 13 taken along line 14—14 of FIG. 13;

FIG. 15 is an end view of a ported block component of the mix head of FIG. 13 taken along line 15—15 of FIG. 11;

FIG. 16 is a top view of the ported block of FIG. 15;

FIG. 17 is a front view of the ported block of FIG. 15;

FIG. 18 is a cross-sectional top view of the ported block of FIG. 15;

FIG. 19 is a front view of a sleeve component of the mix head of FIG. 13;

FIG. 20 is a cross-sectional bottom view of the sleeve of FIG. 19 taken along line 20—20 of FIG. 19; and FIG. 21 is a cross-sectional end view of the sleeve of FIG. 19 taken along line 21—21 of FIG. 19.

DESCRIPTION OF THE PREFERRED EMBODIMENTS

Figure 1:
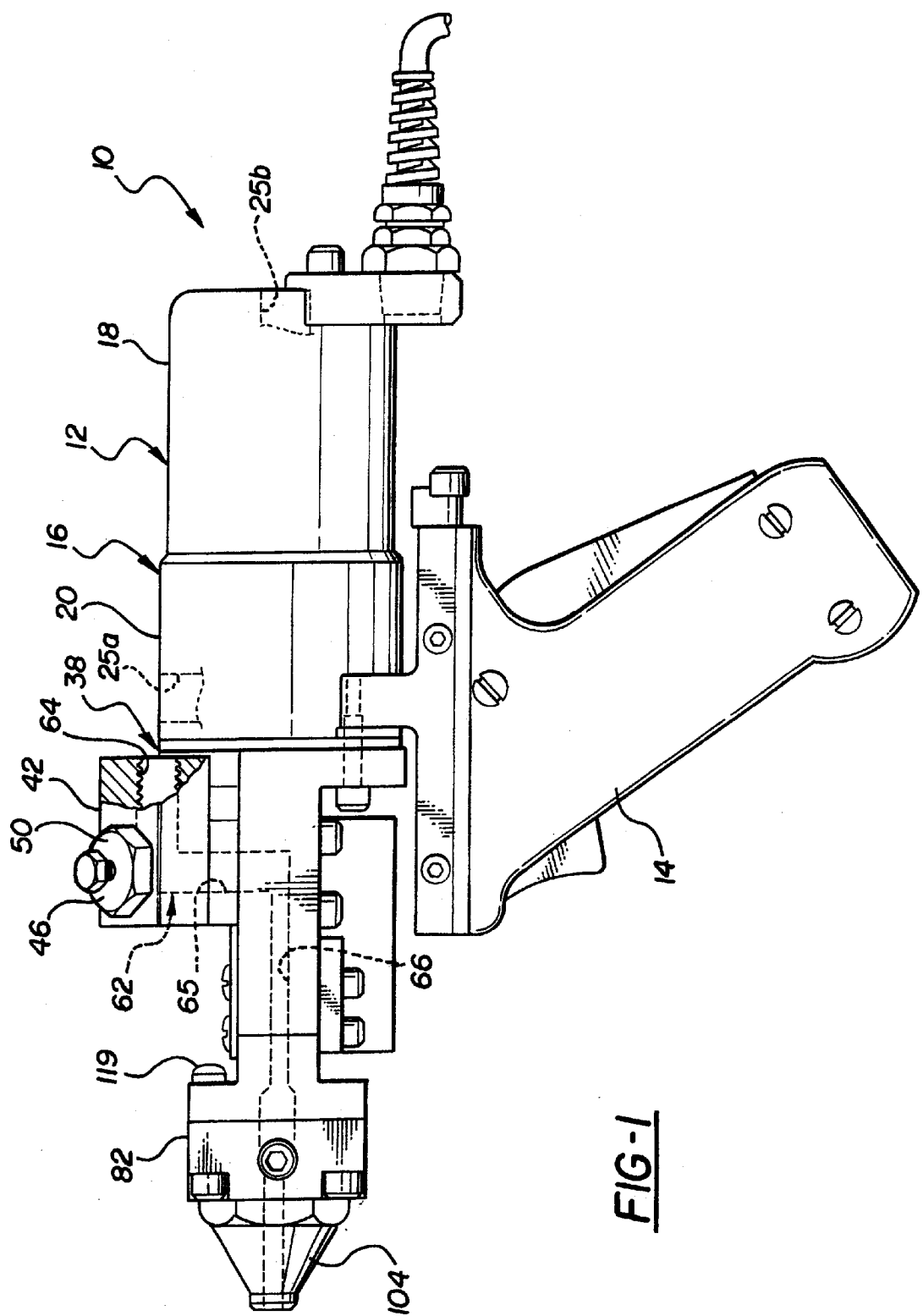
FIG. 1 is an elevational side view of the preferred embodiment of the present invention, showing the optional trigger handle.

An apparatus for dispensing and applying a multi-component foamable fluid plastic material is generally shown at 10 in the Figures. The embodiment shown in FIG. 1 shows an applicator gun generally indicated at 12. The applicator gun 12 may include an optional trigger handle 14. Opening and closing of the gun is controlled by an electronic controller in a manner described below. The electronic controller is shown in the form of a control panel at 128 in FIG. 9. The optional trigger handle 14 is used as an alternate means to send an electronic signal to the electronic controller 128 which, in turn, sends a signal to selectively operate a hydraulic cylinder assembly, generally indicated at 16 and thereby open and close the gun 12. It will be appreciated, however, that use of the optional trigger handle assembly 14 is not necessary to operate the gun.

The controller 128 controls all aspects and functions of every part of the dispenser system and gun 12. The system can be used in one of two ways: "manual" mode or "automatic" mode. When manual mode is utilized, the dispenser system and gun will respond to manual inputs to dispense foam, i.e., via a signal from the optional trigger handle 14 or the pressing of a dispense button on a touch screen of the electronic controller 128. When in manual mode, robot or automation signals generated by the controller 128 are disregarded.

When the automatic mode is selected, the metering system and gun will respond only to the signals sent via the electronic controller 128 to dispense foam, i.e., via a discrete signal from a robot controller or some other automation control or a signal sent over a network such as a remote I/O or "data highway plus" or RS232. When in automatic mode, manual inputs are disregarded. Therefore, the optional trigger handle 14 is a means for a user to send a dispense signal to the dispenser controller within the electronic controller 128 when the system is used in manual mode.

The trigger handle 14 can be likened to a dispense signal that a robot controller would send to a dispense control in the electronic controller 128 when the system is used in automatic mode. Thus, the dispenser control within the electronic controller 128 controls the applicator gun 12. The trigger handle 14 or robotic controller can request that a preprogrammed/preselected shot be dispensed from the gun 12 by sending a signal to the controller 128, but nothing happens unless and until the electronic controller 128 causes it to happen.

It is to be appreciated that the gun 12 is always opened and closed by a signal sent by the electronic controller 128. The trigger handle 14 merely provides an alternate means to send a dispense signal to the electronic controller 128 which responds by controlling the opening and closing of the gun 12. When the trigger handle 14 is not used, the opening and closing of the gun 12 is robotically controlled by the electronic controller 128.

Figure 5:
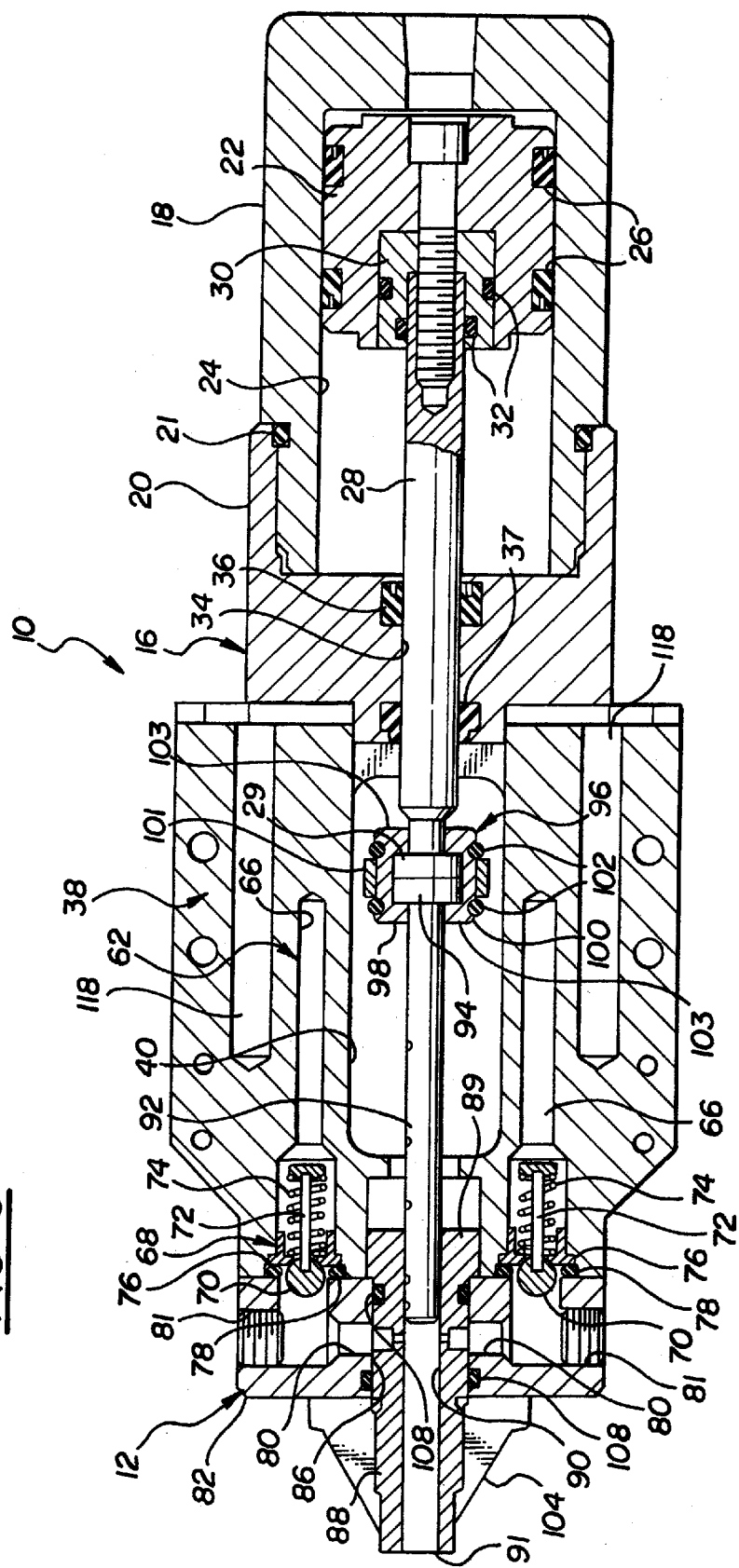
FIG. 5 is a cross sectional view taken along lines 5—5 of FIG. 2 showing a valve needle of the invention in a rearward open position.

As best seen in FIG. 5, the hydraulic cylinder assembly 16 includes a hydraulic cylinder body 18 connected to a hydraulic cylinder head 20 in any suitable manner. An appropriate seal, such as an O-ring seal 21 is disposed between the hydraulic cylinder body 18 and hydraulic cylinder head 20. A hydraulic piston 22 reciprocates within a bore 24 in the hydraulic cylinder body 18. A pair of hydraulic lines is in fluid communication with the bore 24. The hydraulic lines enter through openings 25a, 25b (FIG. 1) in the hydraulic cylinder assembly 16. One of the hydraulic line openings 25a is positioned such that it allows hydraulic fluid to flow into and out of the bore 24 forward of the piston 22. The second hydraulic line opening 25b is positioned such that it allows hydraulic fluid to flow into and out of the bore 24 rearward of the piston 22. In this manner, hydraulic actuation of the piston 22 is controlled in a normal manner, well known in the art. A plurality of suitable seals 26, such as O-ring energized lip seals are disposed about the piston 22 to prevent the flow of hydraulic fluid around the piston 22 within the bore 24. A solenoid directional valve is used to control the hydraulic cylinder assembly 16 to open and close the gun 12.

A connecting rod 28 is secured to the piston 22 in any suitable manner. In the preferred embodiment, the connecting rod 28 is fixed to a piston washer 30 that is retained in the piston 22. The piston washer 30 moves with the piston 22, thereby moving the connecting rod 28. Suitable seals 32, such as O-ring seals are disposed between both the piston washer 30 and piston 20 and between the piston washer 30 and connecting rod 28. The hydraulic cylinder head 20 includes a bore 34 for receiving the connecting rod 28. Further, a hydraulic seal 36 is disposed about the connecting rod 28 and retained within the hydraulic cylinder head 20. The hydraulic seal 36 prevents the flow of hydraulic fluid about the connecting rod 28 and into the bore 34 in the hydraulic cylinder head 20. A rod wiper 37 is also disposed about the connecting rod 28 in the hydraulic cylinder head 20 to wipe debris from the connecting rod 28.

The hydraulic cylinder assembly 16 is connected to a support body structure in the form of a gun body, generally indicated at 38 in FIGS. 1–6. The gun body 38 includes a longitudinally extending bore, shown at 40 in FIG. 5, for receiving the connecting rod 28 (and valve needle as described below).

Figure 2:
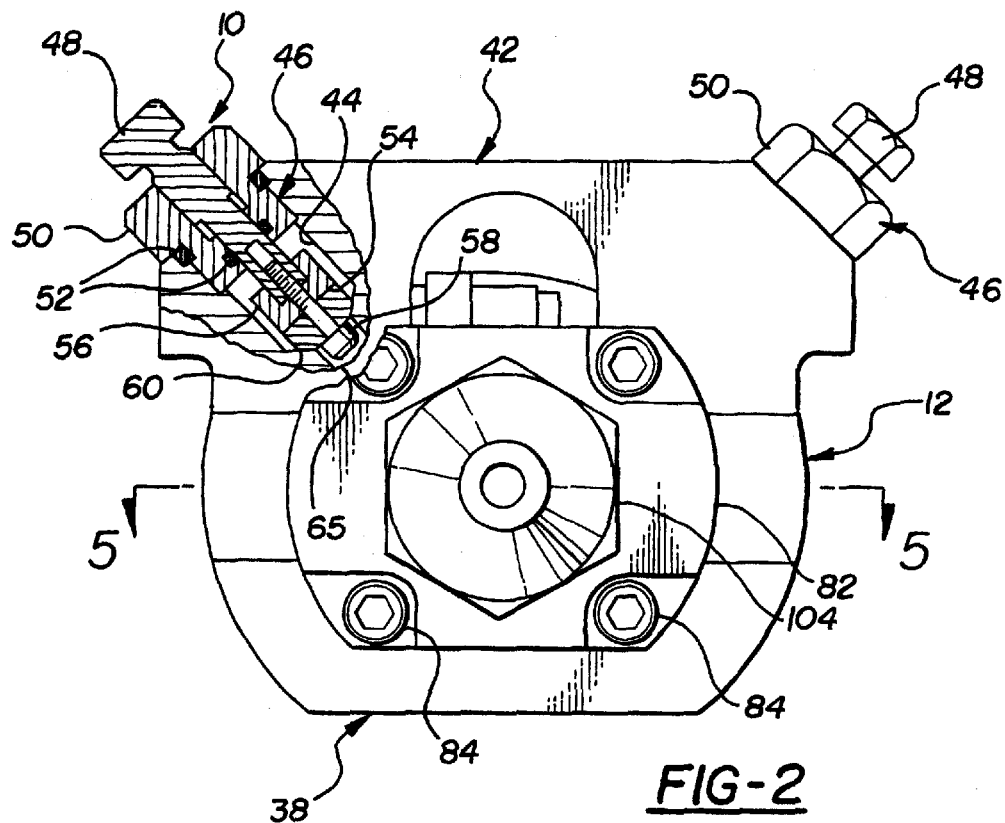
FIG. 2 is a front end view of the preferred embodiment, without the optional trigger handle, partially in cross section.
Figure 3:
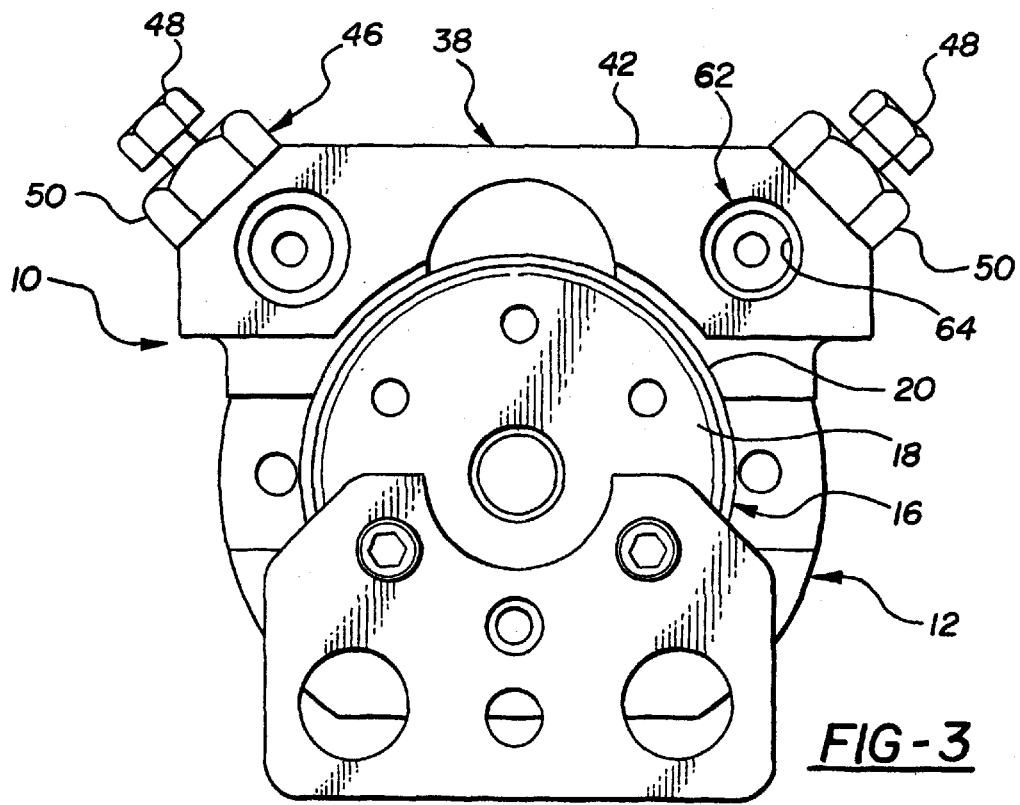
FIG. 3 is a rear end view of the preferred embodiment, without the optional trigger handle.

The gun body 38 includes a fluid inlet manifold shown at 42 in FIGS. 1–4. The fluid inlet manifold 42 is mounted on the gun body 38 to allow the respective components of the foamable plastic material to flow into the gun body 38 (as best seen in FIGS. 2 & 3). The fluid inlet manifold 42 includes at least a pair of openings 44. Each opening 44 is adapted to receive a valve assembly generally indicated at 46 in FIGS. 1–3. The valve assembly 46 includes a valve stem 48 that is maintained within the opening 44 by a retainer 50. The retainer 50 is secured within the opening 44 in any suitable manner. The valve stem 48 is preferably threadedly retained within the retainer 50. Suitable seals 52, preferably O-ring seals, are disposed between the retainer 50 and the gun body 38, and between the valve stem 48 and retainer 50 to prevent the flow of fluid therepast.

As is best shown in FIG. 2, the valve assembly 46 further includes a valve 54 and a valve washer 56. A screw 58 is disposed within the valve 54 and valve washer 56. The screw 58 is threadedly received within a bore in the valve stem 48. The screw 58 connects the valve 54 and valve washer 56 with the valve stem 48. The valve 54 has a tapered end 60 that seats against the fluid inlet manifold 42 when the valve assembly 46 is in the closed position to prevent reactant fluid flow into the gun. When the valve assembly 46 is in the normally open position, the tapered end 60 is unseated from the gun body and allows reactant fluid to flow therepast. The valve assembly 46 is moved between the closed and normally open positions by turning the valve stem 48. Rotation of the valve stem 48 causes respective movement of the valve 46. By allowing for manual shut off of the reactant fluid flow at the valve assembly 46, the flow of reactant fluid into the gun body can be manually controlled to allow servicing of the gun 12 or the like.

Figure 6:
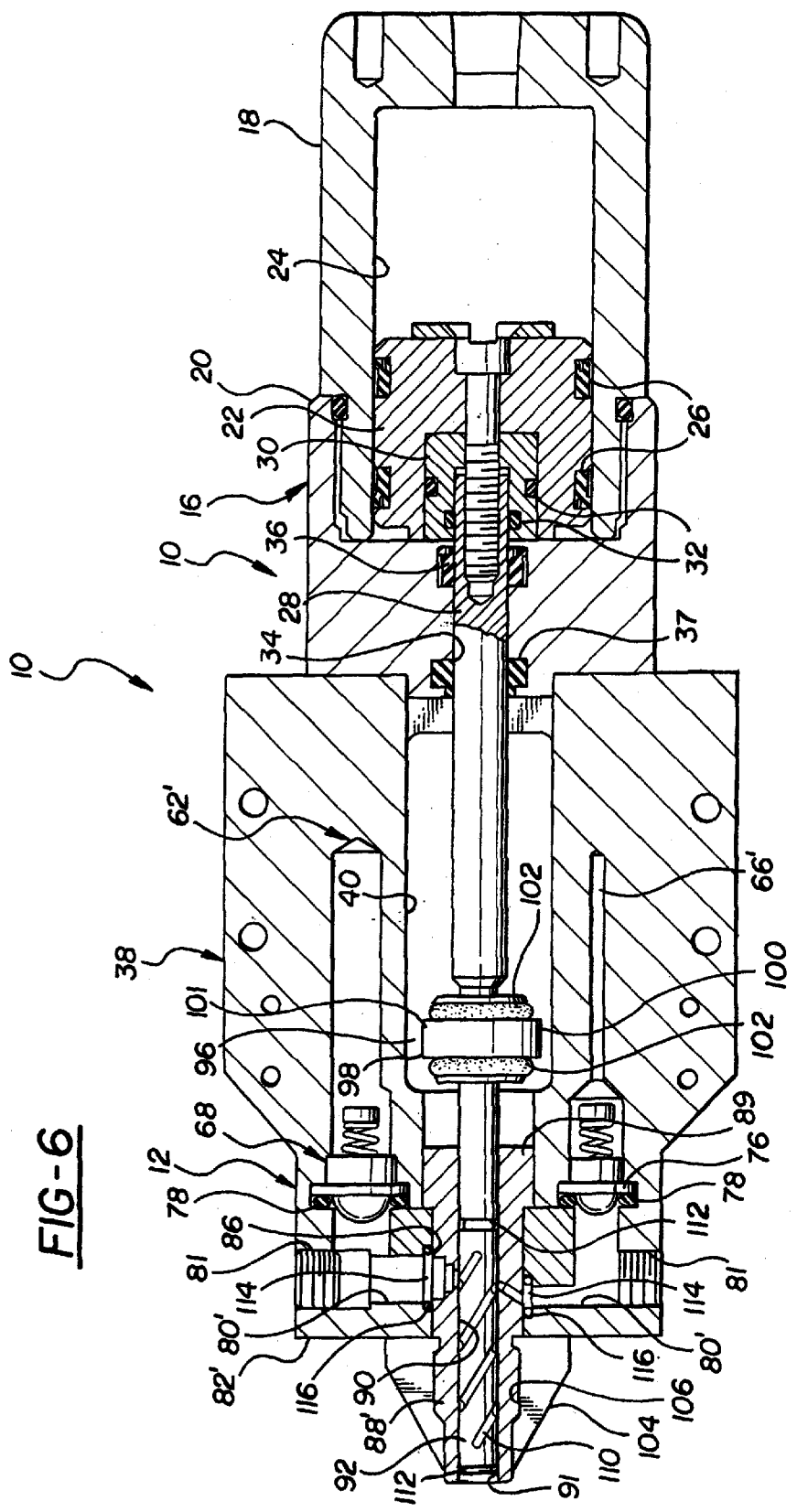
FIG. 6 is a cross sectional view similar to FIG. 5 showing an alternate embodiment showing the valve needle in a forward closed position.

The gun body 38 includes a fluid inlet or fluid inlet passage, generally indicated at 62 in FIGS. 1–3 and 5 and at 62' in FIG. 6 (a prime designation is used to denote similar components having modified structures among the embodiments), connected to each of the openings 44. While the inlet passage 62, 62' may take any suitable configuration, in the preferred embodiment, each fluid inlet passage 62, 62' comprises three passage components 64; 65, 65' and 66, 66'. An inlet passage component 64 is disposed in the fluid inlet manifold 42. The reactant fluid hose attaches to the fluid inlet manifold 42 at the rear thereof, where the inlet passage component 64 commences (FIG. 3). The inlet passage component 64 terminates in the opening 44. A transverse passage component 65, 65' is disposed within the fluid inlet manifold 42 and is oriented transverse to the longitudinal direction of the gun body 38 and TRAVERS to the inlet passage component 64. This transverse passage component 65, 65' is in fluid communication with the opening 44. The tapered end 60 of the valve 54 is oriented at the top of the transverse passage component 65, 65' and seals the top end when valve assembly 46 is in the closed position. The bottom end of the transverse passage component 65, 65' is connected to a longitudinal passage component 66, 66'. The longitudinal passage component 66, 66' extends generally in the longitudinal direction of the gun body 38.

As shown in FIGS. 5 and 6, the longitudinal passage component 66, 66' includes a ball check assembly generally indicated at 68 therein. The ball check assembly 68 can be of any type well known in the industry. As shown, the ball check assembly 68 primarily includes a ball 70 connected to a pin 72. The pin 72 is operatively connected to a spring 74. A ball seat 76 is also operatively associated with the spring 74. In operation, the ball 70 is normally biased by the spring 74 against the ball seat 76 such that fluid cannot flow past. As fluid is introduced through the fluid passage 62, 62' fluid flows through the longitudinal passage component 66, 66' and forces the ball 70 out of engagement with the ball seat 76 to allow reactant fluid flow toward the mixing chamber, as will be described below. The ball check assembly 68 prevents the flow of fluid in the opposite direction, by the action of the ball 70 with the ball seat 76. A suitable seal 78, such as an O-ring seal may be disposed between the ball seat 76 and mix head 82 adjacent the ball seat 70.

The longitudinal passage component 66, 66' of the fluid inlet passage is connected to a mixing chamber fluid inlet 80, 80'. That is, the longitudinal passage component 66, 66' and the mixing chamber fluid inlet 80, 80' are in fluid communication. The mixing chamber fluid inlet 80 is downstream of the ball check assembly 68.

The mixing chamber fluid inlet 80, 80' preferably extends generally transverse to the longitudinal component 66, 66' of the fluid inlet. A cap 81 closes the mixing chamber fluid inlet 80, 80' in one direction to prevent fluid flow outward of the gun 12. In the embodiments shown, the mixing chamber fluid inlet 80, 80' tapers from a generally wider top portion connected to the longitudinal passage component 66, to a generally narrower bottom portion that is connected to the mixing chamber at an orifice or fluid inlet opening.

A mix head 82 is connected to the forward portion of the gun body 38. The mix head 82 is secured to the gun body 38 with suitable fasteners, such as cap screws 84 (FIG. 2). The mixing chamber fluid inlet 80, 80' is contained within the mix head 82.

The mix head 82 contains a sleeve receptacle in the form of a longitudinal bore 86 extending through the mix head 82. The longitudinal bore 86 houses a sleeve 88, 88'. The sleeve 88 is maintained in the bore 86 by including an outer annular flange 89. The outer annular flange 89 engages the mix head 82 to prevent axial movement of the sleeve 88, 88' outwardly of the gun 12.

The sleeve 88, 88' also has a longitudinal bore therethrough, which defines the mixing chamber 90. The mixing chamber fluid inlet 80, 80' also passes through the wall of the sleeve 88, 88' in a direction generally transverse to the longitudinal axis of the sleeve 88, 88'. The mixing chamber fluid inlet 80, 80' is thus in fluid communication with the mixing chamber 90 to allow reactant fluid to enter the mixing chamber 90.

The mixing chamber 90 includes an outer end 91 through which the reacted fluid exits the gun 12. Thus, reactant fluid enters the mixing chamber 90 through the inlets 80, 80' and the mixed reacted fluid exits the mixing chamber 90 through the outer end 91.

As shown in FIG. 5, the fluid passage 62 and mixing chamber fluid inlets 80 have generally the same diameter for each of the fluid inlet openings. This works well when standard reactants are used as described above, having comparable ratios of the volumes of the inlet fluids needed for the reaction, and comparable viscosities of the reactant fluids.

As shown in FIG. 6, the fluid passages 62' may have different diameters. Furthermore, the diameters of the respective mixing chamber fluid inlets 80' and fluid inlet openings may be different. This becomes important when the ratio of the volume of the reactant materials varies and/or the viscosity of one of the reactant materials is substantially different than the viscosity of the other reactant material, such as, for example, when using the no or low isocyanate reactant as described above. The mixing chamber fluid inlets 80' are machined to sizes that will provide respective desired fluid pressures for a given viscosity and flow rate. In addition, as shown in FIG. 6, the portion of the mixing chamber fluid inlet 80' passing through the sleeve 88' to the fluid inlet opening, may be slightly angled. This allows the reactant fluid to be more evenly dispersed over the reactant fluid stream entering from the opposite side of the mixing chamber 90. In this manner, better mixing of the reactant fluid stems is achieved to achieve a more complete reaction.

In addition, as shown in both FIGS. 5 & 6, two inlet passages 62, 62' are shown. It will be appreciated that any number of inlet passages 62, 62' may be used within the scope of the present invention depending on the number of reactant streams necessary for a proper reaction. It is preferred, however, that the forward edges of the mixing chamber fluid inlets 80, 80' be aligned in the direction of the longitudinal axis of the sleeve 88. This is important because when mixing commences, as will be described below, each mixing chamber fluid inlet 80, 80' preferably is exposed at the same time for proper reaction of the components.

The gun 12 further includes a valve needle 92. The valve needle 92 is disposed for reciprocating movement within the mixing chamber 90. The valve needle 92 is removably connected to the connecting rod 28 at the end of the connecting rod opposite that connected to the piston 22.

In the embodiments shown, the removable connection between the connecting rod 28 and valve needle 92 is as follows. The end of the connecting rod 28 includes an annular flange 29. Similarly, the valve needle 92 includes an annular flange 94 at one end. A coupler generally indicated at 96 has two halves 98, 100. The coupler assembly 96 surrounds each of the annular flanges 29, 94. When the two halves 98, 100 are placed around the flanges 29, 94 a retainer sleeve 101 is placed about the coupler 96 to secure the halves 98, 100 together. The retainer sleeve 101 comprises cylindrical tubing. A pair of O-rings 102 then snap into grooves (in the outer surface of the halves 98, 100) to hold the sleeve 101 and prevent sliding movement of the sleeve 101 relative to the halves 98, 100. As shown in FIG. 5, each of the halves 98, 100 includes a leg 103 at each end to engage the respective flanges 29, 94. With the coupler 96 secured in this manner, the valve needle 92 is secured to the connecting rod 28.

To disconnect the valve needle 92 from the connecting rod 28, the user must simply remove each of the O-rings 102 from each of the halves 98, 100. The sleeve 101 is then removed from the halves 98, 100. The halves 98, 100 can then be separated and the valve needle 92 can be removed from the connecting rod 28. A quick connect/disconnect coupler 96 of the type shown in the Figures allows the valve needle 92 to easily be removed from the mixing chamber 90 to allow cleaning of the mixing chamber 90, or similar service on the gun. While one type of coupler 96 has been shown, it will be appreciated that any type of coupler that allows for relatively quick connection/disconnection between the valve needle 92 and connecting rod 28 falls within the scope of the present invention.

The coupler 96 can be engaged/disengaged with no more tools than one small screwdriver. The coupler 96 allows for axial and radial misalignment between the valve needle 92 and the hydraulic cylinder connecting rod 28. The coupler 96 can be engaged/disengaged with the gun stuck in either the open or closed position.

The sleeve 88 extends outwardly of the mix head 82 in the forward direction. The sleeve 88 has an outer surface that includes male threaded position forward of the mix head 82. A lock collar 104 is disposed about the end of the sleeve 88 that protrudes from the mix head 82. The lock collar 104 has a female threaded position that engages the male threaded portion of the sleeve 88. Thus, the lock collar 104 is threaded onto the male threaded position to thereby secure the lock collar 104 with the sleeve 88 and prevent axial movement of the sleeve 88 through the mix head 82 in the direction toward the gun body 38. Thus, the sleeve 88 is prevented from axial movement outward of the gun 12 by the annular flange 89 engaging the mix head 82, and is prevented from axial movement inward of the gun 12 by the threaded connection between the sleeve 88 and the lock collar 104.

In the embodiment of FIG. 5, the sleeve 88 and the mix head 82 are accurately machined to provide a very close fit between the respective parts. Both the exterior wall of the sleeve 88 and interior wall of the mix head 82 are generally cylindrical. It is important that the sleeve 88 and mix head 82 are in very close proximity. That is, the dimensional tolerance between the sleeve 88 and mix head 82 is very small, as is known in the art. If the space between the sleeve 88 and mix head 82 is too great, the reactant fluids may seep about the periphery of the sleeve 88 and react in the longitudinal bore 86 and outside of the mixing chamber 90. Of course, this is undesirable. The components using the standard reactants defined above allow for the sleeve 88 and mix head 82 to be machined to a close fit without the need to further seal the mixing chamber fluid inlet 80 at the connection of the sleeve 88 and mix head 82. Notwithstanding the close fit that prevents fluid flow about the exterior of the sleeve 88, suitable seals 108, such as O-ring seals may be placed between the sleeve 88 and mix head 82 forward and rearward of the mixing chamber fluid inlet 80.

Similarly, the valve needle 92 and interior surface of the sleeve 88 are accurately machined to provide a very close fit between the respective parts. Both the valve needle 92 and interior surface of the sleeve 88 are cylindrical. It is important that the valve needle 92 and the interior surface of the sleeve are in very close proximity. This is because the valve needle 92 serves two important functions. First, when the needle 92 is in a forward closed position (shown in FIG. 6) it covers the mixing chamber fluid inlets 80, 80' so as to act as a valve and prevent the flow of the reactant fluids into the mixing chamber 90. As the valve needle 92 moves to the rearward or open position (As shown in FIG. 5), the valve needle 92 moves past the mixing chamber fluid inlets 80, 80', exposing them to the mixing chamber 90 at the same time.

After the desired amount of reacted material has exited the mixing chamber 90, the valve needle 92 moves from the open to the closed position. The second important function of the valve needle 92 takes place during this movement. Specifically, the valve needle 92 acts to clean the mixing chamber 90 of residual reactant and reacted fluids by scraping the wall of the mixing chamber 90. This movement causes the remaining fluid in the mixing chamber 90 to be purged from the mixing chamber 90. When the valve needle 92 is in the closed position, the end of the valve needle 92 is preferably even with the opening at the outer end 91 of the mixing chamber 90, or the valve needle 92 extends slightly forwardly of the outer end 91 and out of the mixing chamber 90. This aids in purging any reacted or remaining reactant fluids from the mixing chamber 90.

As shown in FIG. 6, the valve needle 92 may also include a groove 110 to aid in scraping the wall of the mixing chamber 90. The groove 10 scrapes the build up (sometimes referred to as varnishes) from the bore of the sleeve that defines the mixing chamber 90. The groove 110 scrapes the bore as the valve needle 92 moves in both directions (that is while opening and closing the gun). Another function of the groove 110 is to minimize the contact area between the valve needle 92 and the sleeve wall. In this manner, the groove 110 also helps break the metal-to-metal bond that tends to form between the valve needle 92 and sleeve wall that can seize the gun.

In the preferred embodiment, the groove 110 is helical. A second helical groove (as shown in FIG. 6) may also be incorporated which is circumferentially offset from the first helical groove. The helical grooves 110 should be oriented such that the groove 110 can not simultaneously expose the mixing chamber fluid inlets 80, 80'. That is, the two helical grooves cannot connect the mixing chamber fluid inlets 80, 80' to the same groove 110. As shown in FIG. 6, each different helix is connected to the different inlets 80, 80'. If only a single helix is used, its pitch must be such that it does not connect the inlets 80, 80'.

The valve needle 92 may also include a pair of annular grooves 112. The annular grooves are disposed such that one of the annular grooves 112 is positioned forward of the mixing chamber fluid inlets 80, 80' when the valve needle 92 is in the forward closed position. The second of the annular grooves 112 is positioned rearward of the mixing chamber fluid inlets 80 when the valve needle 92 is in the forward closed position. The annular grooves 112 serve to prevent reactant fluids from passing thereby. That is, any residual reactant fluid will collect in the annular groove 12 and react, thus creating a seal at that point between the valve needle 92 and the interior wall of the mixing chamber 90.

In the alternate embodiment of the sleeve 88', as shown in FIGS. 6 & 7, and mix head 82', as shown in FIG. 6, the exterior wall of the sleeve 88' is generally rectangular at the area where it engages the sleeve receptacle of the mix head 82'. Similarly, the interior surface 86' defining the sleeve receptacle of the mix head 82' is rectangular to mate, in close proximity with, the exterior wall of the sleeve 88'. The mix head 82' includes at least one recess 114 in a flat sidewall of the sleeve receptacle 86'. The recess 114 surrounds the mixing chamber fluid inlet 80'. Alternatively, the recess 114 could be placed in the exterior wall of the sleeve 88'.

It is preferred that, a recess 114 surrounds each mixing chamber fluid inlet 80. A suitable seal 116, such as an O-ring seal is disposed in the recess 114 and is compressed between the sleeve 88' and the sleeve receptacle 86' of the mix head 82'. The O-ring 116 prevents the reactant fluid from passing between the sleeve 88' and the sleeve receptacle 86' of the mix head 82'. This sealing arrangement is particularly effective when one or more of the reactant fluids are not relatively viscous, and could seep through the press fit arrangement of the previous embodiment of FIG. 4 as discussed above.

Furthermore, when the sleeve 88' having a generally rectangular configuration is used, it is preferred to make the mix head 82' in two halves, one of which is shown in FIG. 7. The halves are split in the longitudinal direction along the top and bottom surfaces. It is preferred that the split not be located on the sides including the recesses 114. Furthermore, while the sleeve 88' is preferably rectangular, it may take other configurations. It has been found, however, that a relatively flat interface between the sleeve receptacle 86 of mix head 82' and the sleeve 88', and the incorporation of a recess 114 to receive an O-ring 116, provides a suitable sealing arrangement.

The gun body 38 further includes at least one heating element 118. The heating element 118 is positioned in the gun body 38 in proximity to the fluid passage 62, 62' to maintain the reactant fluids at an elevated temperature necessary for proper reaction. The heating element 118 heats the gun body 38 sufficiently to allow the first shot of reacted material to be useful. In the preferred embodiment, two heating elements 118 are used. One heater 118 is placed next to each of the inlet passages 62, 62'. The use of two heaters 118 results in properly balanced heating of the gun 12.

The heating element 118 heats the gun body 38 to a temperature to maintain the reactant fluids at a suitable reaction temperature. As described below, the reactant fluids are typically preheated to a suitable reaction temperature before being transmitted to the application gun 12. Typically, at start-up, the gun body 38 is not at a suitable temperature for the foaming reaction to occur. In prior art assemblies, the heat energy contained in the reactant fluid streams, and the heat energy given off by the foaming reaction is used to heat the gun body and maintain it at a suitable reaction temperature. This is undesirable because the first shots of the reactant fluid existing the mixing chamber 90 are not useable. The heating element 118 is used to preheat the gun body 38 so that heat energy is not dissipated from the reactant fluid streams, thus maintaining the reactant fluid at a suitable reaction temperature so that the first shot emanating from the mixing chamber 90 is useable. The temperature of the gun body is monitored by a temperature sensor 119 (FIG. 1). The temperature sensor comprises a thermocouple feedback system that uses a heating control washer thermocouple 119. The sensors 119 could also be RTD'S. The sensors 119 provide a temperature feedback signal to the electronic controller 128 so that it can accurately control the gun temperature by controlling the power sent to the heating elements 118 in the gun 12.

In the preferred embodiment, a pair of heating elements 118 is used. Each heating element 118 is preferably an electric cartridge heater. There are many other ways of heating the gun body 38. For example, the heating element 118 may comprise coring inside the gun body 38 through which a heated liquid such as a water/glycol mixture is run.

The gun body 38 also includes a pair of proximity switches 120, 122 (FIG. 4) located on the bottom side thereof. The proximity switches 120, 122 may be mounted on a bracket 124. The proximity switches 120, 122 detect the two positions of the gun 12. The two switches 120, 122 are a gun closed switch 120 and a gun open switch 122. The gun closed switch 120 detects when the gun 12 is closed and the gun closed switch 120 is on. The open switch 122 detects when the gun 12 is open and the open switch 122 is on.

The electronic controller 128 controls the entire dispensing system. The proper sequencing of the gun 12 is as follows.

When the electronic controller 128 receives a dispense signal (either in manual mode by the trigger handle 14 or push button, or in automatic mode via robot or automation control signal) and providing a shot type has been selected in the electronic controller 128 and providing the system 10 is ready to dispense (not refilling, at pressure at temperature, not faulted, etc.) the controller 128 begins the sequence. First, the controller 128 energizes a directional valve to send hydraulic fluid to the gun 12 to open it. As the gun 12 opens, the gun closed proximity switch 120 signal goes from "on" to "off." When the signal goes off, the controller 128 causes the metering unit 130 to advance a predetermined amount (volume) at a predetermined rate (flow rate). When the gun open 122 proximity switch goes on, the controller 128 stops energizing the open gun directional valve which in turns stops hydraulic fluid flow to the gun 12 to stop the opening motion of the gun 12. When the controller 128 has sensed (via a position feedback transducer) that the metering unit 130 has displaced the proper volume of reactants for the shot requested, the controller 128 energizes the closed gun solenoid directional valve (A three position, double solenoid valve) and causes the metering unit 130 to stop. When the gun-closed proximity switch 120 goes on, the controller 128 stops energizing the closed gun directional valve which in turn stops hydraulic fluid flow to the gun 12 trying to close it. The controller 128 then reports the success (or lack of) of the shot dispensed and whether or not it is ready for the next shot.

The gun 12 of the apparatus 10 has been described in detail above. The apparatus 10 also includes a reactant fluid delivery system or dispenser generally indicated at 126 in FIG. 9. The reactant fluid dispenser 126 includes the electronic controller 128, and hydraulic power unit 140 as will be hereinafter described. The reactant fluid dispenser 126 also includes a metering unit 130 and a reactant fluid heater generally indicated at 134.

Preferably, the metering unit 130 is a fixed ratio positive displacement metering unit with constant flow rate control. (FIG. 9) The positive displacement metering unit 130 can be a single-acting piston displacement (lance type) metering assembly with positive shut-off (power) flow valves 150 on both the inlet 152 and outlet 154 of the meter assembly 130 with a driver 156. (FIG. 9a) The driver 156 could include a heavy-duty hydraulic cylinder 158 or an electric servomotor with a ball screw actuator.

Alternatively, the metering unit 130 could include a precision tool steel gear pump with driver. The driver could be a hydraulic motor or an electric drive servomotor with gear reducer.

The constant flow rate of the metering unit 130 can be achieved in a number of ways. For example, a constant flow rate of the metering unit 130 can be achieved by using a hydraulic cylinder/motor. A pressure compensated flow control or proportional flow control valve 160 with hydrostat 162 is used to control the speed of the driver 156. (FIG. 9a) By doing so, the load on the driver 156 (from the meter assembly 130) can vary because of pressure or viscosity changes of the fluid, but the driver 156 will hold speed because of the pressure compensated flow of the hydraulic fluid to the driver 156. Thus, the flow of reactant fluid from the metering unit 130 is constant. Alternatively, the constant flow rate of the metering unit 130 can be achieved by using an electric drive servomotor with ball screw actuator or servomotor with a gear reducer. An amplifier that powers the servomotor is configured for velocity mode. By doing this, the servo drive will hold speed against a variable load because of the feedback circuit between the servomotor and its amplifier.

Another method for achieving constant flow rate is to use any of the driver configurations listed above, but a position and velocity loop is closed between a servo control in the controller 128 and a position feedback transducer 164 in the metering unit. The position feedback transducer 164 may include a linear encoder when used for lance meters or may include a rotary encoder when used for gear pumps.

Figure 9:
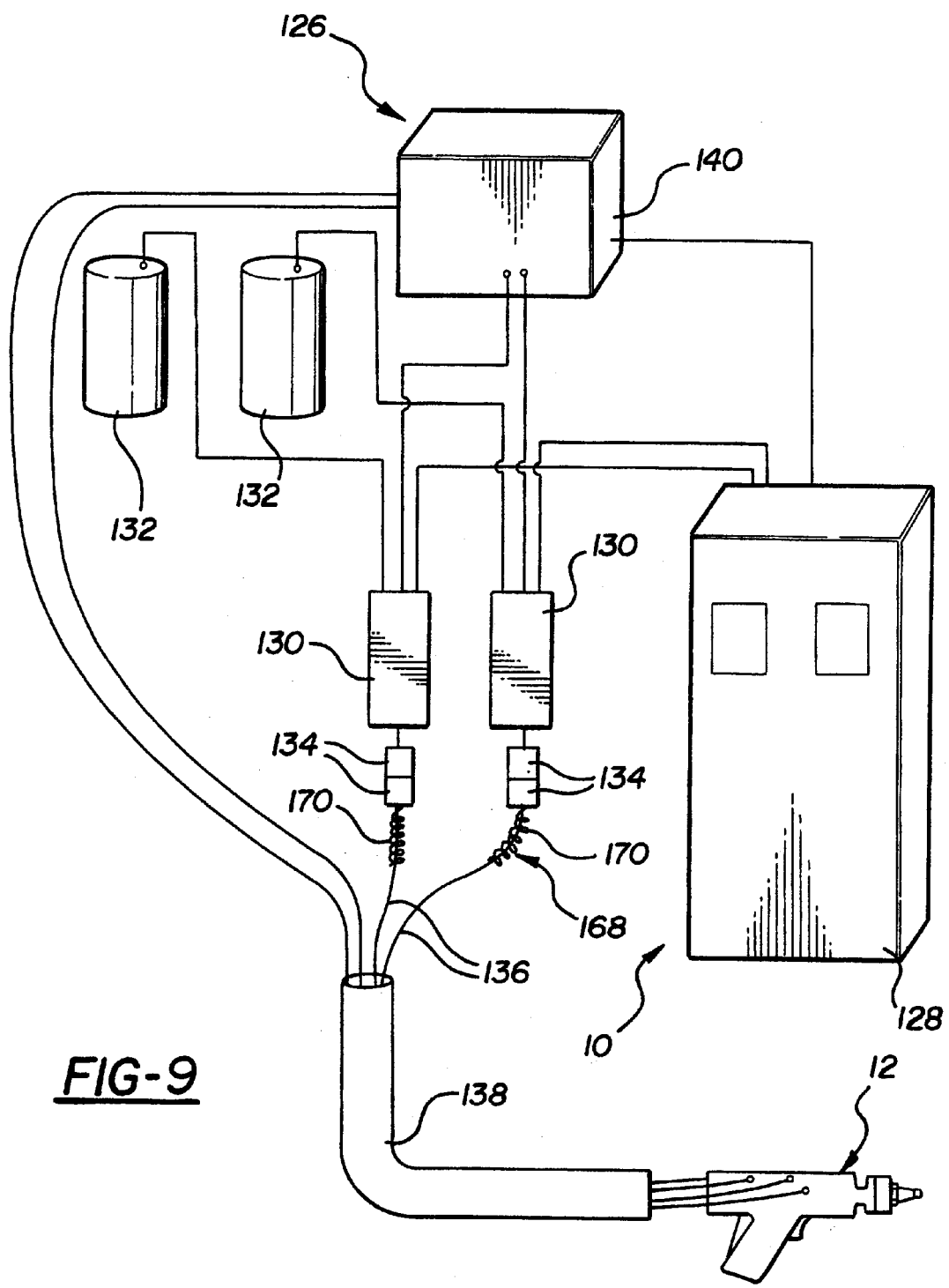
FIG. 9 is a schematic view of the entire apparatus for applying a foamable material.
Figure 9A:
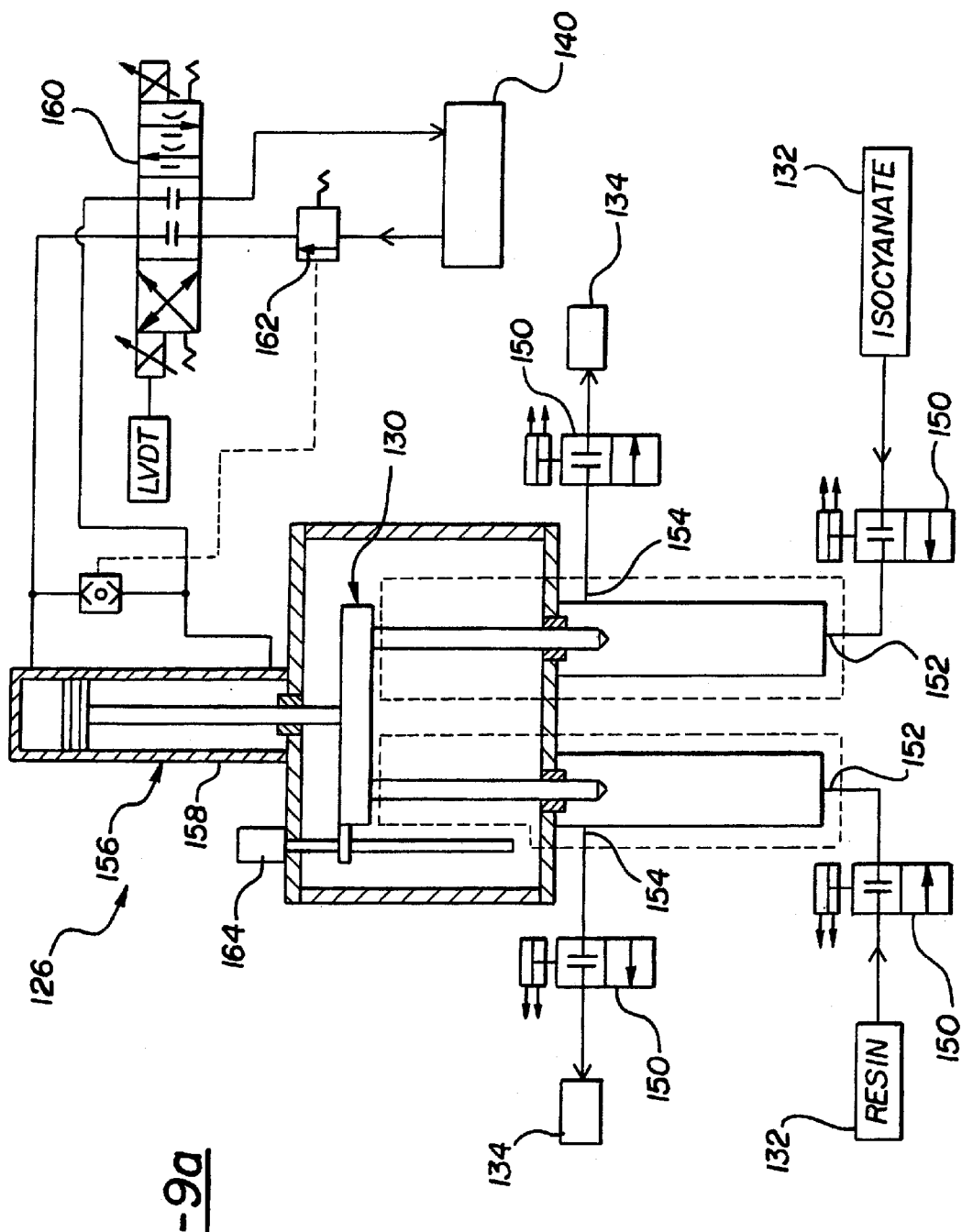
FIG. 9a is a schematic view of the reactant fluid delivery system of the present invention.

A schematic diagram for a reactant fluid dispenser 126 including a two component fixed ratio positive displacement constant flow metering unit 130 is shown in FIG. 9a as used on conventional foam production dispenser systems. The ratio of reactant fluid flow rates is fixed but is changeable by changing one or both of the meter assembly 130 pistons/rod diameters and packings. A position transducer 164 (in this example) is used for position control only.

FIG. 9b shows a two component, adjustable ratio, positive displacement constant flow rate dispenser 126b as used for the alternate reactants with no or low isocyanates. (Elements of dispenser 126b shown in FIGS. 9b and 10 that are the same or analogous to elements shown in FIGS. 9 and/or 9a bear the same reference numeral only with the suffix "b".) The adjustable ratio dispenser system 126b allows adjustability of the reactant fluid flow rate ratio by changing the rates of one of the metering units 130b versus the rate of the other 130b. A position transducer 164b in the form of a linear encoder is used with a servo control for more precise position and velocity control. The meter assemblies 130b are heated and controlled since fluid heaters (preheaters) 134b are included upstream of the inlets 152b of the meter assemblies 130b (as described below). This dispenser 126b thus meters heated fluid, which is more accurate than heating the fluid after it is metered.

The metering unit 130, in the preferred embodiment, is a single acting unit. That is, the metering unit delivers reactant fluid in only one direction of the stroke of the unit. The metering unit 130 also preferably uses a heavy-duty hydraulic cylinder drive 156. The metering unit 130 is in fluid communication with and draws reactant fluid from supply tanks 132. The reactant fluid supply tanks 132 contain the reactant fluids used in the system.

Filling of the metering units 130 never occurs while the gun 12 is open. At startup, when commanded to, or whenever the controller 128 determines that there is insufficient reactant material resident in the meters 130 to deliver a shot (via a position transducer) and the system is not dispensing, the controller 128 causes the metering units 130 to refill. This sequence is as follows. The outlet valves on a metering unit 130 are held closed. Inlet valves are opened. A proportional directional valve is controlled to cause the hydraulic cylinder to retract. The retracting cylinder draws the meter rods upwardly and out of the meter assemblies. While refilling, the controller 128 monitors pressure in both meters to insure that the supply of reactant fluid can keep up. If pressure in either meter falls below a minimum set point, the refill halts and waits for the supply pressure to rebuild before resuming the refill cycle. This is to prevent cavitating meters. If the refill is halted for too long, the controller 128 declares a refill fault and sends the appropriate signal. Once the hydraulic cylinder is fully retracted, the refill cycle ends and the proportional directional flow control valve is centered and the inlet valve closed.

Once the refill cycle ends, the recharge cycle begins. This cycle is as follows. The inlet and outlet valves on the meters are held closed. The proportional directional flow control valve is controlled to cause the hydraulic cylinder to advance at a slow rate. While the cylinder is advancing, the controller 128 monitors hydraulic pressure at the driving end of the hydraulic cylinder. The controller 128 also monitors meter pressures to insure that both sides are primed with reactant fluid and that one or the other meter does not over-pressurize. When the hydraulic pressure (at the cylinder) is equal to or greater than a minimum set point (a recharge pressure) the recharge cycle ends. When the recharge cycle ends, the proportional directional flow control valve is centered and on the preferred embodiment, outlet valves are opened. If all other aspects of the system are satisfactory, the controller 128 issues the appropriate ready to dispense signal.

In the preferred embodiment as shown in FIG. 9a, to achieve the fixed ratio displacement of the reactant fluid, one hydraulic cylinder 158 drives both metering unit pistons at the same time. A single hydraulic drive unit 156 is connected to each of the pistons in the metering unit 130 to dispense the reactant fluid.

Alternatively, as shown in the FIG. 9b embodiment, each of the metering units 130b is shown connected to its own hydraulic cylinder 158b. Each cylinder 158b uses a separate high performance proportional directional flow control valve 160b. That is, two separate drives 156b are shown for driving the respective metering unit pistons that deliver the respective reactant fluids. This system is utilized for the alternate reactants with no or low isocyanates.

Fluid heaters 134 are preferably located at the outlet end of the metering units 130. As shown in the FIG. 9a embodiment, each of the metering units 130 is connected to two fluid heaters 134 in series. The first fluid heater 134 of each pair is a preheater and generally set at a lower temperature setting than the post (second) heater 134. The preheater 134 feeds partially heated reactant fluid to the post heater 134. The post heater 134 is more accurately controlled by the controller 128 using thermocouple feedback including a thermocouple that is disposed in the reactant fluid itself to monitor the temperature of the fluid and not the temperature of the heater block. A reactant fluid hose 136 is connected to the outlet of each fluid post-heater 134. The other end of each reactant fluid hose 136 is connected to one of the inlet passages 64 on the applicator gun 12. Although, in the preferred embodiment, two metering units 130 are provided as are two pairs of fluid heaters 134, other embodiments may include only a single metering unit connected to a single pair of fluid heaters or a single fluid heater. It will be appreciated that any number of metering units 130, fluid heaters 134 and hoses 136 may be utilized within the scope of the present invention.

Figure 10:
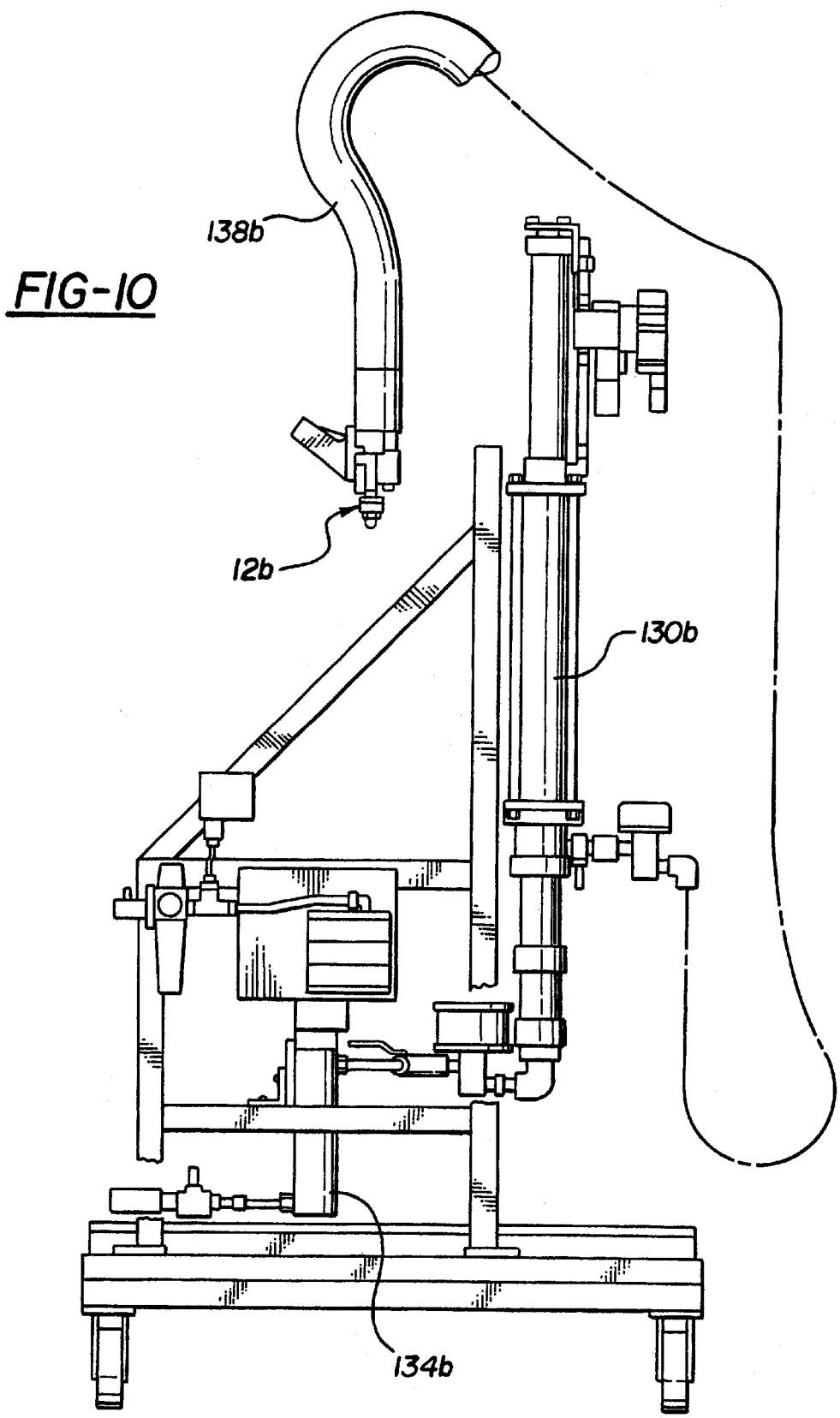
FIG. 10 is a side elevational view of the reactant fluid delivery system of FIG. 9b.

An alternative heating arrangement is shown in FIGS. 9b and 10. According to the embodiment of FIGS. 9b and 10, fluid heaters 134b are located upstream of the respective metering units 130b. (In other embodiments the metering units 130 themselves may be heated.) It will be appreciated that fluid heaters 134 can be either upstream of the respective metering units 130, on the metering units themselves, or on the outlet sides of the metering units 130.

Each of the hoses shown at 136 in FIG. 9 includes a heating assembly 168. Each hose preferably is wound with a heating element 170 to maintain the reactant fluid at its elevated temperature. The heating assembly 168 also includes a thermocouple feedback to the electronic controller 128. Each of the heated hoses 136 is then wound together inside a bundler 138. Preferably, the heating elements 170 on each of the hoses 136 are electric. All of the electric elements 170 around the hoses 136, the hydraulic lines necessary for operation of the gun, and the electrical wiring between the gun and the electronic controller are similarly wrapped in the bundler 138.

It will be appreciated, however, while the hoses 136 are preferably heated by electronic heating elements, other methods of heating the hoses 136 are within the scope of the present invention. For example, fluid lines can be placed around the hoses and a heated water/glycol system can be circulated through the system to maintain the hoses 136 at their elevated temperature. The bundler 138 is insulated to inhibit the loss of heat from the hoses 136.

As stated above, the electrical control panel generally controls the temperature, pressure and volume (by controlling displacement of the fluid meter or the turning of a precision gear pump) and flow rate. The volume of the reactant fluid can be controlled independently of the flow rate which is controlled by the rate of advance of the piston within the metering unit or, alternatively, by the speed of a precision gear pump, depending upon which dispensing system is utilized. The control panel 128 is preferably a programmable logic controller that is used to monitor and send signals to adjust the temperature, pressure, volume and flow rate of the reactant fluids (as described above). The electrical control panel 128 is used to monitor the temperature of the gun heating element 118. The electric control panel 128 monitors separate signals from PID temperature controllers to adjust the temperature. The electrical control panel 128 also controls the opening and closing of the gun 12.

The hydraulic power unit 140 is in fluid communication with both of the metering units 130 and the gun 12 through the use of suitable hydraulic hoses and valving in any well-known manner. In the preferred embodiment, the hydraulic power unit comprises a double pump set up. First, a variable displacement piston pump is used for driving the metering unit 130 as set forth in detail above. A proportional directional valve controls the movement of the metering unit. A second pump, such as a vane pump or another variable displacement pump is also utilized to power and open and close the gun 12 via a directional solenoid valve as set forth in detail above. It is preferred that the hydraulic lines from the hydraulic power unit 140 to the gun 12 are also included within the heated bundler 138 as stated above.

In operation of the apparatus 10, the electrical control panel 128 is energized, as is the hydraulic power unit 140. The fluid heaters 134, heated bundler 138 and heating elements 118 of the gun 12 are also energized to preheat these devices. The temperature of each of these is controlled by the electrical control panel 128. Each of the fluid heaters 134, heated bundler 138 and heating elements are allowed to reach a suitable reaction temperature.

Once the devices are at a suitable reaction temperature, and the metering units contain enough reactant fluid to deliver a shot, the electronic controller 128 sends a signal to open the gun 12. As set forth above, as the valve needle is retracting, reactant fluids are delivered from the metering unit 130 to the gun 12. It will be appreciated that no reactant fluid flow begins until the gun is switched to the open position and the unit is driving toward the open position as set forth above. When the valve needle 92 reaches the fully retracted position, the gun open switch senses the position of the valve needle 92 and signals the controller 128 to send a signal to the hydraulic actuator to stop movement of the valve needle 92. An appropriate amount of reactant fluid is metered by the metering units 130. The reactant fluid exits the respective fluid heater into the reactant fluid hoses 136 and passes through the hoses 136 in the bundler 138. The hose 136 is maintained at a sufficient temperature to maintain the reactant fluid at the appropriate reaction temperature. The reactant fluid passes through the respective reactant fluid hose 136 to the respective inlet passage component 64. The fluid then passes through the valve 54 into the fluid transverse passage 65, 65'. The reactant fluid passes through the transverse component 65, 65' and into the longitudinal component 66, 66' of the fluid passage 62. The fluid then passes through the ball check assembly 68 and through the mixing chamber fluid inlet 80, 80'. Each of the reactant fluids is delivered to the mixing chamber 90 fluid inlets 80, 80' as described above.

As the gun 12 moves to the open position and the valve needle 92 is drawn rearwardly under the actuation of the hydraulic cylinder assembly 16, the mixing chamber fluid inlets 80 are exposed to the mixing chamber 90. This allows the reactant fluid to enter the mixing chamber 90.

The gun body 38 has been preheated as set forth above and remains heated by the heating elements 118 to maintain the gun body 38 and thereby the reactant fluids at the appropriate reaction temperature. Thus, reactant fluid at the appropriate reaction temperature enters the mixing chamber 90 and is allowed to react therein. The reacted fluid exits the mixing chamber 90 at its outward end 91. Because the gun body 38 includes the heating element 118, the first shot of the gun 12 is useable. When a sufficient amount of reacted material has been dispensed from the gun 12 (a shot), the controller 128 sends a signal to extend the valve needle 92 into the mixing chamber 90 under the actuation of the hydraulic cylinder assembly 16, as set forth in detail above.

The valve needle 92, as it passes through the mixing chamber 90, pushes any remaining reacted fluid or reactant fluids out of the mixing chamber 90. The helical groove 110 aids in scraping the sidewalls of the mixing chamber 90 to purge the mixing chamber of any remaining fluids. Once the valve needle 92 reaches its forwardmost position, the gun closed proximity switch 120 senses the position of the valve needle 92 and sends a signal to the electronic controller 128 which, in turn, sends a signal to the hydraulic unit to stop forward movement of the needle 92.

The process can be repeated to deliver as many shots as are required for a particular application. Generally, the metering units are designed with enough capacity to dispense all the shots required for one job. The units will refill and recharge between jobs. If another shot is requested when the meter capacity is insufficient to displace it, the controller 128 causes the metering unit 130 to refill and recharge first before it responds to the request to dispense, as set forth above. This is one advantage of the gear pump type metering unit, that it never needs to refill.

Figure 11:
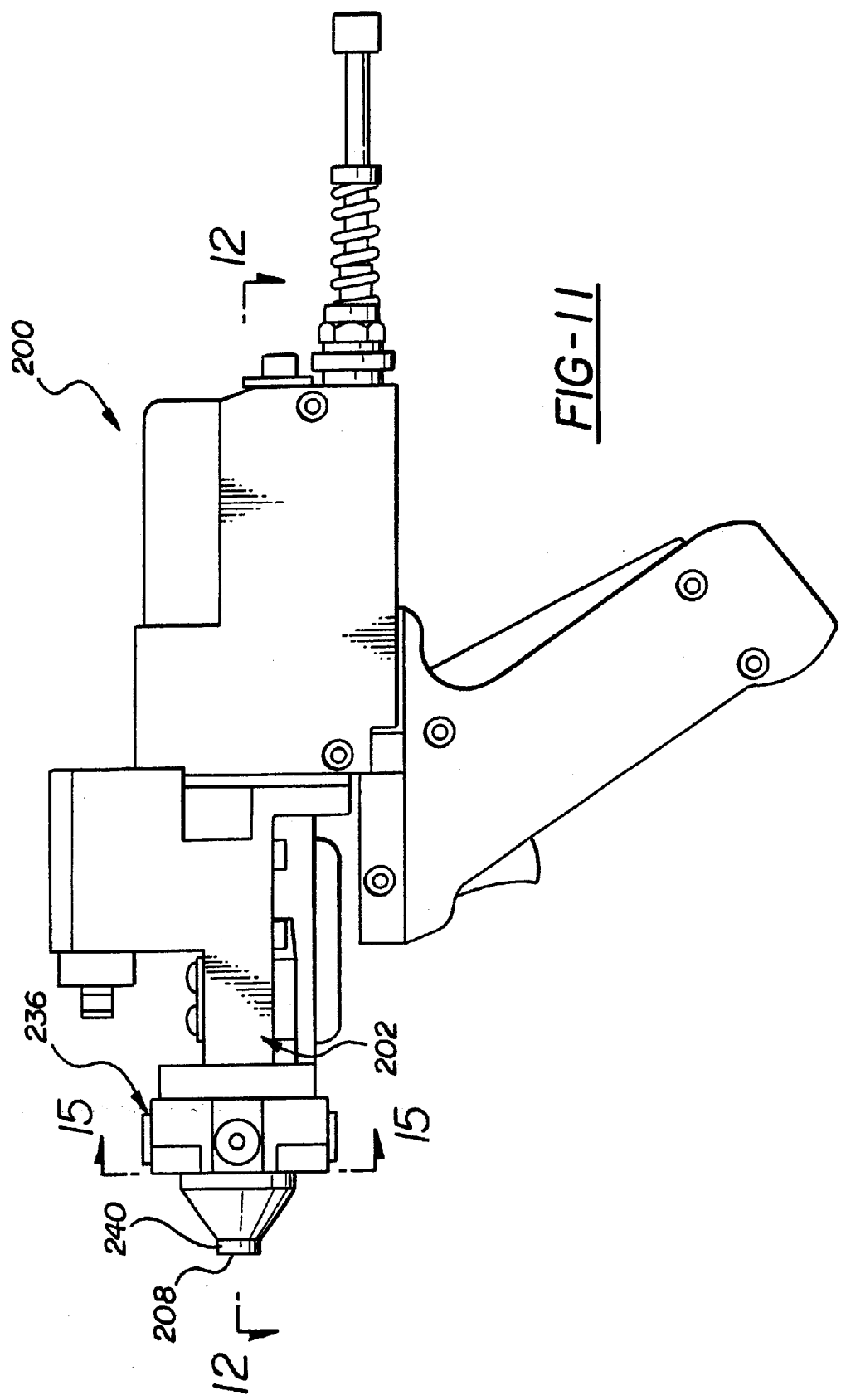
FIG. 11 is a front view of an alternative a mix head embodiment constructed according to the invention and installed in an applicator gun.
Figure 12:
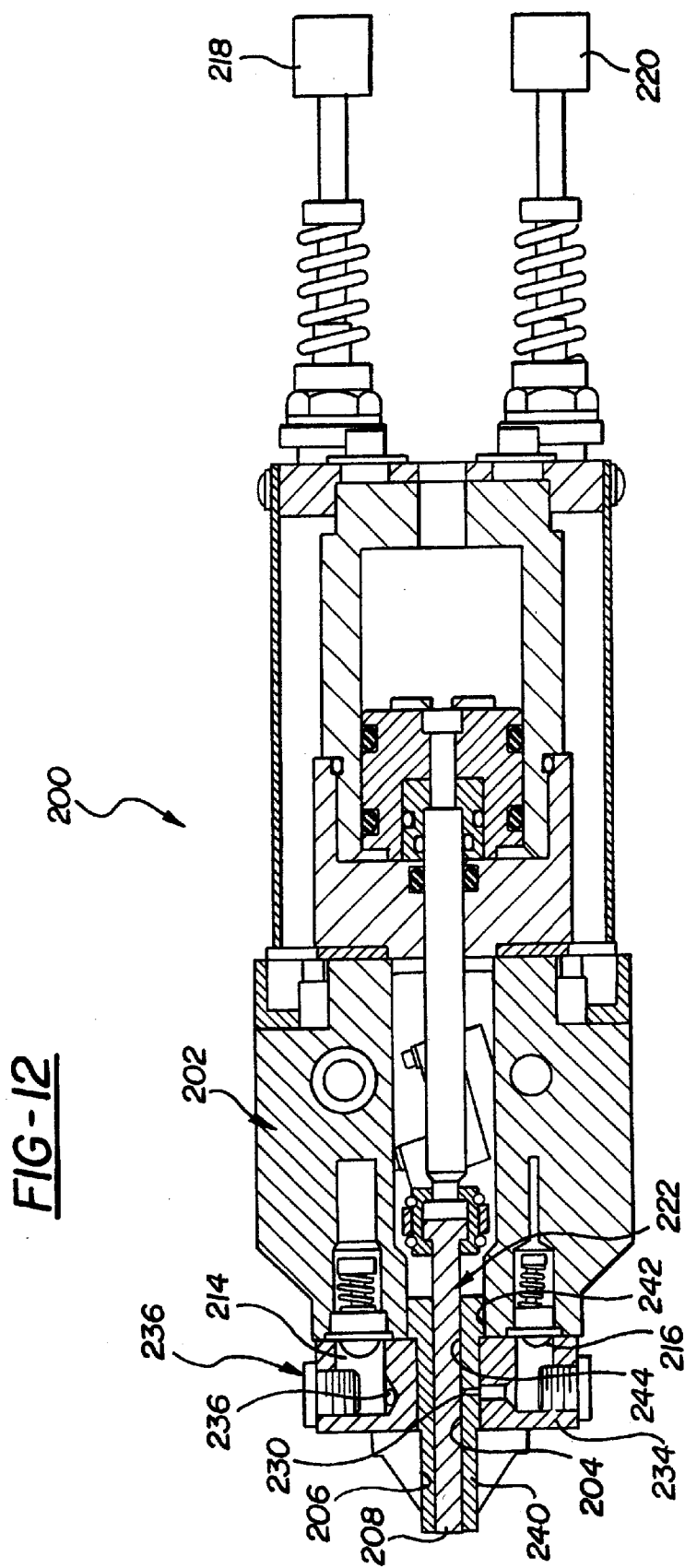
FIG. 12 is cross-sectional top view of the applicator gun of FIG. 11 taken along line 12—12 of FIG. 11.

An alternative foam application gun apparatus for dispensing and applying multi-component foamable fluid plastic materials such as polyurethane foams is generally shown at 200 in FIGS. 11 and 12. The apparatus 200 includes a support body structure 202 and a mixing chamber 204 defined by an axial passage 206 in the support body structure 202. The mixing chamber 204 receives reactant fluids for impingement mixing and allows the mixed reactant fluids to exit through an opening 208 at an axial outer end of the axial passage 206.

As is best shown in FIGS. 14 and 19–21, two generally transverse fluid inlet openings 210, 212 are formed in a wall of the axial passage 206 and are configured to admit reactant fluid into the mixing chamber 204. Reactant fluid sources are schematically shown at 218, 220 in FIG. 12. As shown in FIGS. 12–18, two mixing chamber fluid inlets 214, 216 are formed in the support body structure 202 and are configured to provide fluid communication between the reactant fluid sources 218, 220 and the mixing chamber 204 through the respective inlet openings 210, 212.

An elongated valve needle, generally indicated at 222 in FIGS. 12–14, is supported in the axial passage 206 for reciprocal longitudinal movement between forward closed and a rearward open positions. The valve needle 222 exposes the inlet openings 210, 212 when retracted to the rearward open position to permit the reactant fluids to flow into the mixing chamber 204 from the respective inlet openings 210, 212 and impingement mix therein. The valve needle 222 closes off the inlet openings 210, 212 and dispenses the mixed fluids from the mixing chamber 204 through the opening 208 at the outer end of the axial passage 206 while being advanced to the forward closed position.

As best shown in FIG. 14, the valve needle 222 includes three helical grooves 224, 226, 228 configured to purge the mixing chamber 204 of unreacted and reacted fluids. The three helical grooves 224, 226, 228 are disposed generally parallel to each other in a triple-start helix configuration. When valve needle 222 moves from the closed to the open position, the helical grooves 224, 226, 228 move past the inlet openings 210, 212 in the mixing chamber 204.

The configuration of the three grooves prevents any two inlet openings 210, 212 from being directly connected by a fluid path through one of the needle 222 grooves and allowing reactant fluids to cross over from one inlet opening to another. To further guard against reactant fluid crossover, and as is explained below, the three grooves 224, 226, 228 are filled or allowed to fill with hard polymer. In other words, the grooves 224, 226, 228 are configured to preclude any single groove from providing fluid communication between the mixing chamber 204 inlet openings 210, 212 while the needle 222 is out of the open position. The grooves 224, 226, 228 therefore prevent cross-over around the pin 222 from one inlet opening to another when the gun apparatus 200 is not open.

As shown in FIGS. 12 and 19–21, the apparatus 200 also includes a third fluid inlet opening 230 configured to admit reactant fluid into the mixing chamber 204. The three fluid inlet openings 210, 212, 230 are angled as shown in FIG. 21 to direct the reactant fluids toward each other in three reactant fluid streams such that the three streams generally impinge upon one another at a common impingement point 232 within the mixing chamber 204. This arrangement helps to eliminate direct cross-overs, i.e., the streaming of reactant fluid from one inlet opening directly into another inlet opening.

The three fluid inlet openings 210, 212, 230 are positioned and angled to direct the reactant fluids toward each other at a radially-directed aspect angle selected via vector analysis to provide a better mix by balancing stream forces that the reactant fluid streams exert upon one another at the common impingement point 232.

One of the fluid inlets 214 is configured to direct reactant fluid into the mixing chamber 204 through two inlet openings 210, 212 of the three fluid inlet openings 210, 212, 230. The fluid inlet 214 that directs reactant fluid through those two inlet openings 210, 212 is defined by a mix head block 234 of the support body structure 202 best shown in FIGS. 15–18. The mix head block 234 is ported to split flow from the fluid inlet 214 into two channels 236, 238 that extend to and communicate with the two inlet openings 210, 212.

The fluid inlet 214 that directs reactant fluid through two of the inlet openings 210, 212 is a prepolymer inlet configured to direct prepolymer through those two inlet openings 210, 212. The fluid inlet 216 that directs reactant fluid through the remaining inlet opening 230 is a curative inlet configured to direct curative through the remaining inlet opening 230 and into the mixing chamber 204.

The foam gun apparatus 200 is configured to produce 24:1 ratio low MDI foam. The prepolymer inlet openings 210, 212 are therefore angled to direct two prepolymer streams into the mixing chamber 204 at an approximate 165° radially-directed aspect angle to one another as shown in FIG. 21. In addition, the curative inlet opening 230 is positioned to direct a curative stream into the mixing chamber 204 at an approximate 97.5° radially-directed aspect angle to each of the prepolymer streams entering the mixing chamber 204 from the two prepolymer inlet openings 210, 212 as is also shown in FIG. 21.

The mixing chamber 204 is defined by an elongated, generally tubular steel mix sleeve shown at 240 in FIGS. 11–14 and 19–21. The mix sleeve 240 supported in a sleeve receptacle 242 in the support body structure 202. The fluid inlet openings 210, 212 are disposed in a wall of the sleeve 240 as best shown in FIGS. 19–21.

The support body structure 202 comprises the mix head block 234 which defines a portion of the sleeve receptacle 242. The sleeve receptacle 242 comprises a longitudinal bore 244 of the mix head block 234. The mix head block 234 includes fluid channels configured to deliver reactant fluid to the fluid inlet openings 210, 212. The mix head block 234, mix sleeve 240 and valve needle 222 are included in a mix head assembly 236 of the apparatus 200.

A foam application gun that includes a helically-grooved valve needle 222 can be constructed according to the invention by first fabricating its components, then assembling those components. In assembling the components, before supporting the valve needle 222 in a mixing chamber 204 of the gun 200, the grooves 224, 226, 228 are pre-filled with a suitable material, such as a hard polymer. Pre-filling the grooves 224, 226, 228 in this manner obviates the need to fill the grooves 224, 226, 228 by dispensing 80 to 120 initial "test shots" from the gun 200 before using the gun 200 for its intended purpose. The test shots cause the polyurethane foam being dispensed to accumulate in the helical grooves 224, 226, 228 which breaks down into a hard, brittle urethane mat due to repeated shear forces caused by needle 222 valve sliding movement within the axial passage 206. Repeated shots gradually build up the thickness of the mat until it fills the grooves 224, 226, 228.

Preferably, the hard polymer used to pre-fill the grooves 224, 226, 228 is a one-part heat cure epoxy. One-part heat cure epoxy is preferable over two-part epoxy because there is no time limit for curing the one-part heat-cure epoxy once it has been applied. In addition, one-part heat cure epoxy is known to have a slightly better bonding strength to metals. Epoxy emulates the residual urethane mat that builds up over time and fills the grooves 224, 226, 228.

The invention has been described in an illustrative manner, and is to be understood that the terminology that has been used is in the nature of description rather than of limitation. Obviously, many modifications and variations are possible in light of the above teachings. It is, therefore, to be understood that within the scope of the appended claims the invention may be practiced, otherwise as is specifically described.

What is claimed is:

1. A method for mixing and applying a foamable resin, the method including the steps of:
   providing a support body structure and a mixing chamber supported in the support body structure, the mixing chamber configured to receive reactant fluids for mixing through fluid inlet openings, the mixing chamber defined by an axial passage disposed generally transverse to the inlet openings and configured to allow reactant fluids to exit the mixing chamber through an opening at an axial outer end of the axial passage;
   providing an elongated valve needle having at least one helical groove;
   supporting the valve needle in the mixing chamber for reciprocal longitudinal movement between a forward closed and a rearward open position, the valve needle configured to expose the inlet openings when retracted to the rearward open position to permit the reactant fluids to flow into the mixing chamber from the respective inlet openings and impingement mix therein, and close off the inlet openings and dispense the mixed fluids from the mixing chamber through the axial passage while being advanced to the forward closed position, the helical groove in the needle configured to aid in purging the mixing chamber of unreacted and reacted fluid; and
   pre-filling the grooves with a suitable material before supporting the valve needle in the mixing chamber.

2. The method of claim 1 in which the step of pre-filling the grooves with a suitable material includes prefilling the grooves with a one-part heat cure epoxy.

3. An apparatus for dispensing and applying multi-component foamable fluid plastic materials such as polyurethane foams; the apparatus comprising: a support body structure;
   a mixing chamber defined by an axial passage in the support body structure and configured to receive reactant fluids for mixing and to allow the mixed reactant fluids to exit through an opening at an axial outer end of the axial passage;
   two generally transverse fluid inlet openings formed in a wall of the axial passage and configured to admit reactant fluid into the mixing chamber; two mixing chamber fluid inlets formed in the support body structure and configured to provide fluid communication between reactant fluid sources and the mixing chamber through the respective inlet openings; and
   an elongated valve needle supported in the axial passage for reciprocal longitudinal movement between forward closed and a rearward open positions, the valve needle configured to expose the inlet openings when retracted to the rearward open position to permit the reactant fluids to flow into the mixing chamber from the respective inlet openings and impingement mix therein, and to close off the inlet openings and dispense the mixed fluids from the mixing chamber through opening at the outer end of the axial passage while being advanced to the forward closed position, the valve needle including a first helical groove configured to purge the mixing chamber of unreacted and reacted fluids;
   the valve needle including second and third helical grooves disposed generally parallel to the first helical groove in a triple-start helix configuration to reduce metal-to-metal surface area contact between the rod and the mixing chamber and to provide increased scraping action along inner walls of the mixing chamber and the faces of the inlet openings.

4. An apparatus as defined in claim 3 in which the grooves are configured such that no single groove can provide substantial fluid communication between the mixing chamber inlet openings while the needle is out of the open position.

5. An apparatus for dispensing and applying multi-component foamable fluid plastic materials such as polyurethane foams; the apparatus comprising:

a support body structure;

a mixing chamber defined by an axial passage in the support body structure and configured to receive reactant fluids for mixing and to allow the mixed reactant fluids to exit through an opening at an axial outer end of the axial passage;

two generally transverse fluid inlet openings formed in a wall of the axial passage and configured to admit reactant fluid into the mixing chamber;

two mixing chamber fluid inlets formed in the support body structure and is configured to provide fluid communication between reactant fluid sources and the axial passage and to admit reactant fluid into the mixing chamber;

two mixing chamber fluid inlets formed in the support body structure and configured to provide fluid communication between reactant fluid sources and the mixing chamber through an opening at the outer end of the axial passage while being advanced to the forward closed position, the valve needle including a first helical groove configured to purge the mixing chamber of unreacted and reacted fluids; and a third generally transverse fluid inlet opening formed in the wall of the axial passage and configured to admit reactant fluid into the mixing chamber, the three fluid inlet openings angled to direct the reactant fluids toward each other in three reactant fluid streams such that the three streams generally impinge upon one another at a common impingement point within the mixing chamber to eliminate crossovers of reactant fluid from one inlet opening to another.

6. An apparatus as defined in claim 5 in which the three fluid inlet openings are positioned and angled to direct the reactant fluids toward each other at a radially-directed aspect angle selected to provide a better mix by balancing stream forces that the reactant fluid streams exert upon one another at the common impingement point.

7. An apparatus as defined in claim 5 in which the mixing chamber is defined by a mix sleeve supported in a sleeve receptacle in the support body structure, the fluid inlet openings being disposed in a wall of the sleeve.

8. An apparatus as defined in claim 7 in which:

the support body structure comprises a ported block that defines the sleeve receptacle;

the sleeve receptacle comprises a longitudinal bore of the ported block; and the ported block includes fluid channels configured to deliver reactant fluid to the fluid inlet openings.

9. An apparatus as defined in claim 5 in which one of the fluid inlets is configured to direct reactant fluid into the mixing chamber through two of the three fluid inlet openings.

10. An apparatus as defined in claim 9 in which:

the fluid inlet that directs reactant fluid through two of the inlet openings is a prepolymer inlet configured to direct prepolymer through those two inlet openings; and the fluid inlet that directs reactant fluid through the remaining inlet opening is a curative inlet configured to direct curative through the remaining inlet opening.

11. An apparatus as defined in claim 10 in which:

the apparatus is configured to produce 24:1 ratio low MDI foam; the prepolymer inlet openings are angled to direct two prepolymer streams into the mixing chamber at an approximate 165° radially-directed aspect angle to one another; and the curative inlet opening is positioned to direct a curative stream into the mixing chamber at an approximate 97.5° radially directed aspect angle to each of the prepolymer inlet openings.

* * * * *

UNITED STATES PATENT AND TRADEMARK OFFICE
CERTIFICATE OF CORRECTION

PATENT NO.    : 6,315,161 B1                                                Page 1 of 1
DATED         : November 13, 2001
INVENTOR(S)   : Bezaire et al.

It is certified that error appears in the above-identified patent and that said Letters Patent is hereby corrected as shown below:

<u>Title page,</u>
Item [73], Assignee, after "MI (US)" insert
-- Essex Specialty Products, Inc.
   Auburn Hills, MI (US) --

Signed and Sealed this

Tenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,315,161 B1
DATED : November 13, 2001
INVENTOR(S) : Leon J. Bezaire It is certified that error appears in the above-identified patent and that said Letters Patent is hereby corrected as shown below:

Column 2,
Line 14, before "rearward" delete "a".

Column 3,
Line 28, after "alternative" delete "a".
Line 31, after "FIG. 12 is" insert therein -- a -- .

Column 5,
Line 65, after "38 and" delete "TRAVERS" and insert therein -- transverse --.

Column 10,
Line 34, after "fluid" delete "existing" and insert therein -- exiting --.

Column 13,
Line 7, before "the preferred" delete "on" and insert therein -- in --.

Column 18,
Lines 24-25, delete the phrase "such as polyurethane foams".
Lines 66-67, delete the phrase "such as polyurethane foams".

Column 19,
Line 11, before "configured" delete "is".

Signed and Sealed this

Twenty-first Day of January, 2003

JAMES E. ROGAN
*Director of the United States Patent and Trademark Office*